US011935367B2

(12) United States Patent
Savin

(10) Patent No.: US 11,935,367 B2
(45) Date of Patent: Mar. 19, 2024

(54) MULTI-SPORT CHALLENGE SYSTEMS AND METHODS

(71) Applicant: West Flagler Associates, Ltd., Miami, FL (US)

(72) Inventor: Scott Savin, Miami, FL (US)

(73) Assignee: West Flagler Associates, Ltd., Miami, FL (US)

( * ) Notice: Subject to any disclaimer, the term of this patent is extended or adjusted under 35 U.S.C. 154(b) by 0 days.

(21) Appl. No.: 18/226,697

(22) Filed: Jul. 26, 2023

(65) Prior Publication Data

US 2023/0377427 A1 Nov. 23, 2023

Related U.S. Application Data

(63) Continuation-in-part of application No. 18/108,986, filed on Feb. 13, 2023, now Pat. No. 11,769,378, which is a continuation of application No. 17/215,637, filed on Mar. 29, 2021, now Pat. No. 11,580,824.

(51) Int. Cl.
*G07F 17/38* (2006.01)
*G07F 17/32* (2006.01)

(52) U.S. Cl.
CPC .......... *G07F 17/38* (2013.01); *G07F 17/3262* (2013.01); *G07F 17/3295* (2013.01)

(58) Field of Classification Search
CPC .. G07F 17/38; G07F 17/3262; G07F 17/3295; G07F 17/3288; G07F 17/3276; G07F 17/323; G07F 17/3234; G07F 17/3237; G06Q 30/0209; G06Q 50/34; A63C 19/08; A63C 2019/085
See application file for complete search history.

(56) References Cited

U.S. PATENT DOCUMENTS 3,310,312 A * 3/1967 Peeples ................ A63B 57/405 124/81
4,074,905 A * 2/1978 High .................... A63B 47/025 473/421
4,357,659 A * 11/1982 Nathans ................. G06Q 50/34 463/47

(Continued)

*Primary Examiner* — David L Lewis
*Assistant Examiner* — Matthew D Hoel
(74) *Attorney, Agent, or Firm* — AKERMAN LLP

(57) ABSTRACT

A multi-sport challenge system may include a multi-sport facility, a sport challenge menu including a plurality of selectable sport challenges, and a fee/prize subsystem. The multi-sport facility may include a plurality of sport grounds, wherein each of the sport grounds includes a full, partial, or simulated sport grounds. The sport challenge menu may include an entry fee and financial prize corresponding to each selectable sport challenge of the menu, wherein the entry fee is to be paid by a participant that selects the corresponding sport challenge for an opportunity to attempt the sport challenge. The financial prize may be awarded to the participant if the attempt successfully completes the sport challenge. The fee/prize subsystem may be configured to receive sport challenge selections made by participants and to collect the corresponding entry fees from the participants and output corresponding financial prizes upon successful completion of the selected sport challenges.

27 Claims, 5 Drawing Sheets

| Entry Fee | Sport Challenge | Financial Prize |
|---|---|---|
| $10 | Hole in one | $2500 |
| $10 | Bowl three strikes | $250 |
| $10 | Kick 35 yard field goal | $500 |
| $10 | Hit target at home plate from center field | $500 |
| $10 | Make half-court basketball shot | $200 |

(56) References Cited

U.S. PATENT DOCUMENTS

| | | | | | | |
|---|---|---|---|---|---|---|
| 4,915,384 | A * | 4/1990 | Bear | A63B 69/3614 | 473/154 |
| 4,941,662 | A * | 7/1990 | DePerna | E04H 3/14 | 273/317.6 |
| 5,083,271 | A * | 1/1992 | Thacher | G06Q 20/342 | 700/92 |
| 5,359,510 | A * | 10/1994 | Sabaliauskas | G07F 17/3223 | 273/DIG. 26 |
| 5,359,986 | A * | 11/1994 | Magrath, III | A63B 69/406 | 124/78 |
| 5,401,018 | A * | 3/1995 | Kelly | A63B 63/00 | 473/421 |
| 5,443,260 | A * | 8/1995 | Stewart | A63B 69/0002 | 473/421 |
| 5,485,994 | A * | 1/1996 | Underwood | A63B 63/00 | 473/451 |
| 5,733,209 | A * | 3/1998 | McIntyre, IV | A63B 69/409 | 473/133 |
| 5,855,516 | A * | 1/1999 | Eiba | G07F 17/3276 | 700/91 |
| 5,873,782 | A * | 2/1999 | Hall | G07F 17/3288 | 700/91 |
| 5,882,204 | A * | 3/1999 | Iannazo | A63B 24/0021 | 473/422 |
| 5,897,438 | A * | 4/1999 | Kunz | A63C 19/10 | 52/287.1 |
| 5,917,725 | A * | 6/1999 | Thacher | G06Q 20/342 | 463/40 |
| 6,004,211 | A * | 12/1999 | Brenner | G07F 17/32 | 463/40 |
| 6,082,887 | A * | 7/2000 | Feuer | A63F 3/081 | 700/91 |
| 6,089,981 | A * | 7/2000 | Brenner | G06Q 50/34 | 463/40 |
| 6,099,409 | A * | 8/2000 | Brenner | G07F 17/32 | 463/40 |
| 6,174,237 | B1 * | 1/2001 | Stephenson | A63F 13/46 | 463/40 |
| 6,287,202 | B1 * | 9/2001 | Pascal | G07F 17/3211 | 463/25 |
| 6,371,855 | B1 * | 4/2002 | Gavriloff | A63F 13/12 | 463/9 |
| 6,425,828 | B2 * | 7/2002 | Walker | A63F 13/30 | 700/92 |
| 6,443,838 | B1 * | 9/2002 | Jaimet | G06Q 50/34 | 463/16 |
| 6,656,042 | B2 * | 12/2003 | Reiss | G07F 17/3288 | 463/16 |
| 6,669,565 | B2 * | 12/2003 | Liegey | G07F 17/3288 | 463/9 |
| 6,780,103 | B2 * | 8/2004 | Bansemer | G07F 17/3295 | 463/7 |
| 6,811,482 | B2 * | 11/2004 | Letovsky | G07F 17/3295 | 463/20 |
| 6,813,526 | B1 * | 11/2004 | Dodd, Jr. | G05B 19/0423 | 701/123 |
| 6,817,948 | B2 * | 11/2004 | Pascal | G07F 17/3211 | 463/25 |
| 6,955,611 | B2 * | 10/2005 | Kimmel | A63B 67/02 | 473/409 |
| 7,066,845 | B2 * | 6/2006 | Joseph | A63B 69/0071 | 124/78 |
| 7,094,154 | B2 * | 8/2006 | Kellerman | G07F 17/3244 | 463/25 |
| 7,118,498 | B2 * | 10/2006 | Meadows | A63B 71/0669 | 473/409 |
| 7,175,524 | B2 * | 2/2007 | Bansemer | G07F 17/3262 | 463/16 |
| 7,192,352 | B2 * | 3/2007 | Walker | A63F 13/12 | 463/9 |
| 7,364,509 | B2 * | 4/2008 | Slade | G06Q 10/10 | 463/43 |
| 7,548,242 | B1 * | 6/2009 | Hughes | G07F 17/3288 | 463/31 |
| 7,614,944 | B1 * | 11/2009 | Hughes | A63F 13/85 | 463/4 |
| 7,637,809 | B2 * | 12/2009 | Ghosh | G06Q 30/0238 | 700/91 |
| 7,684,874 | B2 * | 3/2010 | Schlottmann | G07F 17/3211 | 463/9 |
| 7,684,882 | B2 * | 3/2010 | Baerlocher | G07F 17/3211 | 463/16 |
| 7,689,302 | B2 * | 3/2010 | Schlottmann | G07F 17/3276 | 463/9 |
| 7,691,009 | B2 * | 4/2010 | Savarese | H01Q 1/40 | 473/316 |
| 7,736,249 | B2 * | 6/2010 | Zhang | F41B 11/52 | 124/78 |
| 7,766,766 | B2 * | 8/2010 | Savarese | H01Q 1/2225 | 473/371 |
| 7,787,972 | B2 * | 8/2010 | Schlottmann | G07F 17/323 | 463/16 |
| 7,791,607 | B1 * | 9/2010 | Hughes | A63F 13/30 | 463/31 |
| 7,824,267 | B2 * | 11/2010 | Cannon | G07F 17/34 | 463/16 |
| 7,846,015 | B2 * | 12/2010 | Bansemer | G07F 17/3262 | 463/16 |
| 7,850,523 | B2 * | 12/2010 | Ghosh | G06Q 30/0238 | 700/91 |
| 7,872,655 | B2 * | 1/2011 | Hughes | A63F 13/12 | 463/31 |
| 7,922,586 | B2 * | 4/2011 | Heckendorf, III | G07F 17/3276 | 273/245 |
| 7,934,983 | B1 * | 5/2011 | Eisner | G06F 17/40 | 463/6 |
| 7,985,132 | B2 * | 7/2011 | Walker | G07F 17/3276 | 700/91 |
| 8,002,645 | B2 * | 8/2011 | Savarese | A63B 24/0021 | 473/409 |
| 8,105,166 | B2 * | 1/2012 | Cayce | G07F 17/3272 | 463/40 |
| 8,137,172 | B2 * | 3/2012 | Lydon | G09B 7/00 | 463/40 |
| 8,172,702 | B2 * | 5/2012 | Meadows | G01S 19/19 | 473/407 |
| 8,200,348 | B2 * | 6/2012 | Mazurik | G07F 17/32 | 700/91 |
| 8,202,165 | B2 * | 6/2012 | Duhamel | G07F 17/32 | 463/16 |
| 8,221,269 | B2 * | 7/2012 | Meadows | A63B 71/0669 | 473/409 |
| 8,223,154 | B2 * | 7/2012 | Hughes | A63F 13/30 | 345/475 |
| 8,226,495 | B2 * | 7/2012 | Savarese | G08B 13/1427 | 340/568.6 |
| 8,292,729 | B2 * | 10/2012 | Vlazny | G07F 17/32 | 700/91 |
| 8,313,363 | B2 * | 11/2012 | Maul | G06Q 10/00 | 463/16 |
| 8,317,620 | B2 * | 11/2012 | Kelly | G07F 17/323 | 463/16 |
| 8,333,643 | B2 * | 12/2012 | Eisner | A63K 3/00 | 463/6 |
| 8,425,350 | B2 * | 4/2013 | Savarese | A63B 43/00 | 156/145 |
| 8,430,733 | B2 * | 4/2013 | Chang | G07F 17/38 | 463/11 |
| 8,460,078 | B2 * | 6/2013 | Moore | A63F 13/65 | 463/40 |
| 8,460,079 | B2 * | 6/2013 | Smith | G07F 17/3288 | 463/16 |
| 8,465,376 | B2 * | 6/2013 | Bentley | A63B 24/0006 | 473/226 |
| 8,512,162 | B2 * | 8/2013 | Kim | G09B 19/0038 | 473/407 |
| 8,523,711 | B2 * | 9/2013 | Meadows | G01S 19/40 | 473/407 |

(56) References Cited

U.S. PATENT DOCUMENTS 8,538,563 B1 * 9/2013 Barber ................ G07F 17/3276 463/28
8,556,752 B2 * 10/2013 Meadows .......... A63B 71/0669 473/409
8,585,477 B2 * 11/2013 Cho ................... A63B 69/3658 463/3
8,613,676 B2 * 12/2013 Bentley .................. A63B 60/46 473/316
8,620,463 B2 * 12/2013 Doherty ............. A63B 24/0021 473/131
8,624,738 B2 * 1/2014 Savarese ............ G08B 13/1481 340/568.6
8,641,546 B2 * 2/2014 Rauchholz ........... A63B 53/047 463/31
8,641,547 B2 * 2/2014 Rauchholz ............. A63B 53/06 473/215
8,641,548 B2 * 2/2014 Rauchholz ............. A63B 60/22 473/238
8,678,892 B2 * 3/2014 Ok ..................... G09B 19/0038 463/3
8,700,354 B1 * 4/2014 Bentley .................. A42B 3/046 702/141
8,702,516 B2 * 4/2014 Bentley ..................... G06T 7/20 463/40
8,758,166 B2 * 6/2014 Savarese ................ A63B 43/00 473/353
8,761,913 B2 * 6/2014 Mazurik ................. G07F 17/32 700/91
8,790,170 B2 * 7/2014 Arnone ............... G07F 17/3225 273/108
8,805,558 B1 * 8/2014 Daniel .................... A63F 13/46 473/169
8,814,647 B2 * 8/2014 Palmer ................ G07F 17/3295 463/2
8,814,700 B2 * 8/2014 Vlazny ............... G07F 17/3288 463/28
8,827,824 B2 * 9/2014 Bentley .................. G06V 40/23 473/266
8,876,607 B2 * 11/2014 Ng ...................... G07F 17/3237 700/91
8,876,619 B2 * 11/2014 Lee ........................ A63B 69/36 473/197
8,882,613 B2 * 11/2014 Zuger .................... G04G 21/00 463/3
8,897,903 B2 * 11/2014 Eisner ...................... A63K 3/00 700/91
8,903,521 B2 * 12/2014 Goree ................ A63B 69/3632 700/90
8,905,855 B2 * 12/2014 Fitzpatrick .............. G06T 13/40 473/199
8,913,134 B2 * 12/2014 Goree ................ G06Q 10/0833 348/157
8,926,443 B2 * 1/2015 Woo ................... A63B 24/0003 463/7
8,934,995 B2 * 1/2015 Eisner ..................... G06F 17/40 700/91
8,941,723 B2 * 1/2015 Bentley ................ A61B 5/6895 348/47
8,944,899 B2 * 2/2015 Arnone ............... G07F 17/3227 273/108
8,944,928 B2 * 2/2015 Kaps .................. G09B 19/0038 473/199
8,994,826 B2 * 3/2015 Bentley ................... G01S 19/19 473/223
9,004,996 B2 * 4/2015 Murakami .............. A63F 13/67 463/3
9,005,047 B2 * 4/2015 Savarese ............ A63B 69/3605 473/283
9,028,337 B2 * 5/2015 Bentley .............. A63B 69/3632 473/223
9,033,810 B2 * 5/2015 Bentley .................. A63B 69/36 473/316
9,039,527 B2 * 5/2015 Bentley ................. A63F 13/573 463/31
9,052,201 B2 * 6/2015 Bentley ................ G01C 25/005
9,076,041 B2 * 7/2015 Bentley .................. G06V 20/40
9,138,638 B2 * 9/2015 Bastawros .............. G01S 19/19
9,199,177 B2 * 12/2015 Knapp .................... A63F 13/00
9,235,765 B2 * 1/2016 Bentley ................ G11B 31/006
9,247,212 B2 * 1/2016 Bose ....................... A63F 13/65
9,261,526 B2 * 2/2016 Bentley ................ A61B 5/6895
9,286,747 B2 * 3/2016 Chang ................. G07F 17/3295
9,320,957 B2 * 4/2016 Bentley .................. A63B 60/46
9,349,049 B2 * 5/2016 Bentley ................ A61B 5/1121
9,361,522 B2 * 6/2016 Bentley .................. G06V 20/40
9,375,624 B2 * 6/2016 Boyd ................... A63B 69/362
9,475,624 B2 6/2016 Boyd
9,393,478 B2 * 7/2016 Niegowski ............. A63B 55/00
9,396,385 B2 * 7/2016 Bentley .................. G11B 27/17
9,399,162 B2 * 7/2016 Lee ...................... A63B 71/022
9,401,178 B2 * 7/2016 Bentley ................ G11B 27/031
9,406,336 B2 * 8/2016 Bose ....................... A63F 13/00
9,409,073 B2 * 8/2016 Boyd ................... A63B 69/362
9,409,076 B2 * 8/2016 Boyd ................ G09B 19/0038
9,418,705 B2 * 8/2016 Kaps ...................... G06V 20/40
9,427,639 B2 * 8/2016 Rauchholz ......... A63B 69/3623
9,433,844 B2 * 9/2016 Boyd ................... A63B 69/362
9,433,845 B2 * 9/2016 Boyd ................. A63B 69/3685
9,440,134 B2 * 9/2016 Nicora ............... A63B 24/0062
9,446,294 B2 * 9/2016 Oldknow ........... A63B 69/3632
9,468,855 B2 * 10/2016 Carlberg ............... A63F 13/798
9,486,669 B2 * 11/2016 Niegowski ......... A63B 24/0021
9,486,694 B2 * 11/2016 Bastawros .......... G06F 16/7867
9,555,307 B1 * 1/2017 Lewis .................... A63B 65/12
9,592,424 B2 * 3/2017 Savarese .......... G06K 19/07758
9,597,570 B2 * 3/2017 Altshuler ........... G09B 19/0038
9,604,142 B2 * 3/2017 Bentley ............. A63B 24/0006
9,607,652 B2 * 3/2017 Bose ...................... H04N 23/90
9,610,480 B2 * 4/2017 Boggs .................... A63B 60/52
9,616,299 B2 * 4/2017 Boggs .................... A63B 60/52
9,619,891 B2 * 4/2017 Bose ....................... A63F 13/65
9,622,361 B2 * 4/2017 Bentley .................. H01Q 1/526
9,623,284 B2 * 4/2017 Lafortune .......... A63B 69/3605
9,626,552 B2 4/2017 Bose
9,626,554 B2 * 4/2017 Bose ..................... G06F 3/0346
9,633,254 B2 * 4/2017 Bose ................ H04M 1/72412
9,640,032 B2 * 5/2017 Arnone ............... G07F 17/3244
9,643,049 B2 * 5/2017 Bentley ............. A63B 24/0003
9,643,064 B2 * 5/2017 Boggs .................... A63B 60/00
9,646,199 B2 * 5/2017 Bose .................... G11B 31/006
9,646,209 B2 * 5/2017 Kaps ..................... A63F 13/212
9,656,134 B2 * 5/2017 Meadows .............. A63B 69/36
9,661,894 B2 * 5/2017 Niegowski ......... A63B 24/0003
9,662,551 B2 * 5/2017 Akiyama ............... A63B 60/54
9,694,267 B1 * 7/2017 Thornbrue ......... A63B 69/0002
9,704,350 B1 * 7/2017 Rigopulos ............. G07F 17/326
9,746,354 B2 * 8/2017 Martin .................... G06F 3/011
9,757,639 B2 * 9/2017 Eisner ...................... A63K 1/00
9,764,213 B2 * 9/2017 Nicora ................... A63B 22/02
9,776,050 B2 * 10/2017 Boggs .................... A63B 60/00
9,789,371 B2 * 10/2017 Boggs .................... A63B 60/00
9,814,935 B2 * 11/2017 Bentley ................... G01P 13/00
9,824,264 B2 * 11/2017 Bose .................. G06Q 10/0639
9,830,951 B2 * 11/2017 Bose ....................... G01P 13/00
9,866,827 B2 * 1/2018 Bose .................. G06Q 10/0833
9,884,235 B2 * 2/2018 Min ....................... A63B 67/06
9,889,346 B2 * 2/2018 Boggs .................... A63B 60/52
9,989,346 B2 2/2018 Boggs
9,911,045 B2 * 3/2018 Bose .................. G08B 21/0492
9,925,433 B2 * 3/2018 Boggs ............... A63B 71/0619
9,940,508 B2 * 4/2018 Kaps ........................ H04N 5/91
9,975,031 B2 * 5/2018 Bastawros .......... G06F 16/7867
9,999,826 B2 * 6/2018 Ro ..................... A63B 69/3623
10,055,941 B2 * 8/2018 Luciano, Jr. .......... G07F 17/326
10,063,929 B1 * 8/2018 Barker ............... H04N 21/4312
10,074,242 B2 * 9/2018 Arnone ............... G07F 17/3262
10,086,249 B2 * 10/2018 Nicora ................... A63B 69/36
10,092,812 B2 * 10/2018 Eisner ...................... A63K 3/00
10,099,112 B1 * 10/2018 Johnson .............. A63F 3/00643
10,109,061 B2 * 10/2018 Bose ..................... A63F 13/812
10,124,230 B2 * 11/2018 Thornbrue ......... G06Q 10/0639

(56) References Cited

U.S. PATENT DOCUMENTS

| | | | | |
|---|---|---|---|---|
| 10,133,919 | B2 * | 11/2018 | Bose | G06F 3/0346 |
| 10,137,347 | B2 * | 11/2018 | Thornton | A63B 53/04 |
| 10,159,885 | B2 * | 12/2018 | Thornton | A63B 53/0466 |
| 10,188,932 | B1 * | 1/2019 | Fierbaugh | A63B 69/0002 |
| 10,207,173 | B2 * | 2/2019 | Pasternak | G06Q 20/14 |
| D842,401 | S * | 3/2019 | Mueller | A63B 69/0002 D21/713 |
| D843,401 | S | 3/2019 | Mueller | |
| 10,220,285 | B2 * | 3/2019 | Thornton | A63B 53/04 |
| 10,226,681 | B2 * | 3/2019 | Thornton | G09B 19/0038 |
| 10,254,139 | B2 * | 4/2019 | Martin | G06F 3/0346 |
| 10,265,602 | B2 * | 4/2019 | Haas | A63B 69/36 |
| 10,315,085 | B2 * | 6/2019 | Danis | A63F 13/428 |
| 10,328,327 | B2 * | 6/2019 | Porter | G06Q 20/102 |
| 10,339,978 | B2 * | 7/2019 | Bose | G06V 20/42 |
| 10,350,455 | B2 * | 7/2019 | Bentley | A63B 24/0062 |
| 10,406,399 | B2 * | 9/2019 | Bentley | A63F 13/211 |
| 10,427,017 | B2 * | 10/2019 | Syed | A63B 69/3632 |
| 10,500,452 | B2 * | 12/2019 | Wallans | G06F 1/1684 |
| 10,504,334 | B2 * | 12/2019 | Arnone | G07F 17/38 |
| 10,546,467 | B1 * | 1/2020 | Luciano, Jr. | G07F 17/3295 |
| 10,561,930 | B2 * | 2/2020 | Richards | G07F 17/3216 |
| 10,569,157 | B2 * | 2/2020 | Mruk | A63D 5/04 |
| 10,589,161 | B2 * | 3/2020 | Blanc | A63B 69/36 |
| 10,607,349 | B2 * | 3/2020 | Bose | A63F 13/812 |
| 10,617,926 | B2 * | 4/2020 | Thornbrue | G06V 40/23 |
| 10,682,562 | B2 * | 6/2020 | Syed | A63B 71/0669 |
| 10,706,273 | B2 * | 7/2020 | Bose | A63B 24/0003 |
| 10,716,989 | B2 * | 7/2020 | Thornbrue | G01C 21/00 |
| 10,748,581 | B2 * | 8/2020 | Bose | G06V 40/23 |
| 10,786,728 | B2 * | 9/2020 | Haas | G06T 19/006 |
| 10,798,044 | B1 * | 10/2020 | Barker | H04L 51/08 |
| 10,874,930 | B2 * | 12/2020 | Schwartz | A63B 71/023 |
| 10,881,908 | B2 * | 1/2021 | Bentley | A63B 24/0062 |
| 10,920,437 | B2 * | 2/2021 | Crookham | A63B 63/004 |
| 10,987,570 | B2 * | 4/2021 | Richards | G09G 5/005 |
| 11,007,417 | B2 * | 5/2021 | Vigneau | A63C 19/08 |
| 11,039,763 | B2 * | 6/2021 | Ye | A61B 5/1118 |
| 11,077,343 | B2 * | 8/2021 | Wallans | A63B 60/50 |
| 11,083,953 | B2 * | 8/2021 | Hermandorfer | G06T 11/60 |
| 11,123,630 | B2 * | 9/2021 | Spremberg | E04H 17/16 |
| 11,130,063 | B2 * | 9/2021 | Barr | A63F 13/211 |
| 11,202,951 | B1 * | 12/2021 | Augustin | G06F 3/011 |
| 11,207,582 | B2 * | 12/2021 | Lewis | A63B 71/0622 |
| 11,305,194 | B2 * | 4/2022 | Schwartz | H04W 4/023 |
| 11,458,378 | B2 * | 10/2022 | Strickland | A63B 71/0669 |
| 2002/0004723 | A1 * | 1/2002 | Meifu | A63B 69/36 705/1.1 |
| 2002/0077165 | A1 * | 6/2002 | Bansemer | G07F 17/38 463/7 |
| 2002/0107590 | A1 * | 8/2002 | Liegey | A63F 3/081 700/91 |
| 2002/0155907 | A1 * | 10/2002 | Bewley | A63B 69/40 473/451 |
| 2003/0008711 | A1 * | 1/2003 | Corbo | G07F 17/3244 700/91 |
| 2003/0171144 | A1 * | 9/2003 | Letovsky | G07F 17/3295 463/16 |
| 2004/0033833 | A1 * | 2/2004 | Briggs | A63G 31/00 463/42 |
| 2004/0039461 | A1 * | 2/2004 | Stefani | G07F 17/32 700/91 |
| 2004/0157684 | A1 * | 8/2004 | Craven, Jr. | A63B 71/02 473/470 |
| 2004/0186600 | A1 * | 9/2004 | Tumacder | G07F 17/3262 700/91 |
| 2005/0026664 | A1 * | 2/2005 | Bansemer | A63F 9/0291 463/7 |
| 2005/0043829 | A1 * | 2/2005 | Rossides | G07F 17/3255 700/91 |
| 2005/0055113 | A1 * | 3/2005 | Gauselmann | G07F 17/32 700/91 |
| 2005/0071024 | A1 * | 3/2005 | Henshaw | G07F 17/32 700/91 |
| 2005/0102047 | A1 * | 5/2005 | Ottofy | G07F 17/3293 700/91 |
| 2005/0170886 | A1 * | 8/2005 | Miller | G07F 17/3288 463/28 |
| 2005/0250590 | A1 * | 11/2005 | Doaga | A63B 71/06 473/150 |
| 2005/0288803 | A1 * | 12/2005 | Ropp | G07F 17/3276 700/91 |
| 2006/0030959 | A1 * | 2/2006 | Duhamel | G07F 17/3276 700/91 |
| 2006/0030960 | A1 * | 2/2006 | Duhamel | G07F 17/3276 700/92 |
| 2006/0064184 | A1 * | 3/2006 | Ream | G07F 17/32 700/91 |
| 2006/0074504 | A1 * | 4/2006 | Maul | G06Q 10/00 700/91 |
| 2006/0121982 | A1 * | 6/2006 | Martin | G07F 17/38 463/25 |
| 2006/0136079 | A1 * | 6/2006 | Stern | G07F 17/32 700/91 |
| 2006/0161276 | A1 * | 7/2006 | Soltani | G07F 17/3279 700/91 |
| 2006/0189386 | A1 * | 8/2006 | Rosenberg | A63F 13/211 463/37 |
| 2006/0229749 | A1 * | 10/2006 | Ghosh | G06Q 30/0221 700/91 |
| 2006/0241795 | A1 * | 10/2006 | Weingardt | G07F 17/32 700/91 |
| 2006/0252476 | A1 * | 11/2006 | Bahou | A63F 13/12 463/4 |
| 2007/0021853 | A1 * | 1/2007 | Ma | G07F 17/3288 700/91 |
| 2007/0129133 | A1 * | 6/2007 | Bansemer | G07F 17/32 463/16 |
| 2007/0135950 | A1 * | 6/2007 | Oliveras | A63F 13/00 700/91 |
| 2007/0265043 | A1 * | 11/2007 | Wang | A63F 13/34 463/2 |
| 2008/0234021 | A1 * | 9/2008 | Palmer | G07F 17/38 463/2 |
| 2009/0023495 | A1 * | 1/2009 | Koustas | G07F 17/32 463/43 |
| 2009/0131173 | A1 * | 5/2009 | Gurnsey | F41A 33/02 463/42 |
| 2009/0191929 | A1 * | 7/2009 | Nicora | A63F 13/798 463/3 |
| 2009/0291782 | A1 * | 11/2009 | Hinn | A63B 67/002 273/374 |
| 2010/0070056 | A1 * | 3/2010 | Coronel | G07F 17/3286 700/91 |
| 2010/0106266 | A1 * | 4/2010 | Mazurik | G07F 17/32 700/91 |
| 2010/0298958 | A1 * | 11/2010 | Connelly | A63B 71/06 473/451 |
| 2011/0003653 | A1 * | 1/2011 | Stemle | A63B 63/007 473/456 |
| 2011/0054645 | A1 * | 3/2011 | Lewis-Smith | G07F 17/3262 700/91 |
| 2011/0127868 | A1 | 6/2011 | Miller et al. | |
| 2011/0251703 | A1 * | 10/2011 | Nguyen | G07F 17/3276 700/92 |
| 2012/0075697 | A1 * | 3/2012 | Astill | G03B 21/58 359/461 |
| 2012/0083908 | A1 * | 4/2012 | Carpenter | G07F 17/3276 700/91 |
| 2012/0083909 | A1 * | 4/2012 | Carpenter | G07F 17/326 700/92 |
| 2012/0123566 | A1 * | 5/2012 | Ross | G07F 17/3293 700/91 |
| 2012/0123571 | A1 * | 5/2012 | Lange | G07F 17/329 700/93 |
| 2012/0179277 | A1 * | 7/2012 | Lymberopoulos | A63B 71/0616 707/E17.014 |
| 2012/0319989 | A1 * | 12/2012 | Argiro | A63F 13/428 345/173 |

(56) References Cited

U.S. PATENT DOCUMENTS

2013/0006402 A1* 1/2013 Carlberg ................. A63F 13/75 700/91
2013/0017911 A1* 1/2013 Kessler ................ A63B 67/002 473/476
2013/0060361 A1* 3/2013 Gabrail ................... A63F 13/58 700/91
2013/0084930 A1* 4/2013 Chang ..................... G07F 17/32 463/11
2013/0116809 A1* 5/2013 Carpenter ........... G07F 17/3225 700/92
2013/0123566 A1 5/2013 Lupold et al.
2013/0144410 A1* 6/2013 Amaitis .............. G07F 17/3288 700/91
2013/0196726 A1* 8/2013 Chang ..................... G07F 17/32 463/25
2013/0245797 A1* 9/2013 Moore ................ A63F 13/5375 700/91
2013/0273986 A1* 10/2013 Arnone ............... G07F 17/3225 463/7
2013/0331968 A1* 12/2013 Newton ................ A63F 13/798 700/92
2014/0039653 A1* 2/2014 Olive .................. G07F 17/3244 700/92
2014/0081438 A1* 3/2014 Knutsson .............. A63F 13/822 700/92
2014/0228084 A1* 8/2014 Arnone ............... G07F 17/3288 463/3
2014/0335924 A1* 11/2014 Arnone ............... G07F 17/3227 463/7
2015/0014924 A1* 1/2015 Asistin, Jr. .......... G07F 17/3276 273/148 R
2015/0028541 A1* 1/2015 Murakami ................ A63F 7/32 273/121 A
2015/0045098 A1* 2/2015 Lim .................... G07F 17/3295 463/3
2015/0088289 A1* 3/2015 Robbins .............. G07F 17/3244 700/91
2015/0141128 A1* 5/2015 Arnone ............... G07F 17/3225 463/25
2015/0265925 A1* 9/2015 Knapp .................... A63F 13/00 463/3
2015/0294535 A1* 10/2015 Hightower ............. G07F 17/38 463/7
2016/0074738 A1* 3/2016 Dokhanian ........ G06Q 30/0207 473/415
2016/0171839 A1* 6/2016 Arnone ............... G07F 17/3295 463/7
2016/0199736 A1* 7/2016 Knapp .................. A63F 13/812 463/42
2016/0220878 A1* 8/2016 Devathi ............... A63B 43/004
2016/0358425 A1* 12/2016 Luciano ................ G07F 17/326
2017/0007881 A1* 1/2017 Penttila .................. A63B 65/10
2017/0157484 A1* 6/2017 Altshuler ........... G09B 19/0038
2017/0206745 A1* 7/2017 Arnone ............... G07F 17/3288
2017/0213422 A1* 7/2017 Arnone ............... G07F 17/3286
2017/0236380 A1* 8/2017 Arnone ............... G07F 17/3244 463/7
2017/0296894 A1* 10/2017 Min ................... A63B 71/0622
2017/0304705 A1* 10/2017 Hermandorfer ... A63B 69/0002
2018/0040203 A1* 2/2018 Winters .............. G07F 17/3225
2018/0174402 A1* 6/2018 D'Avanzo ............... G07F 17/38
2019/0005774 A1* 1/2019 Arnone ............... G07F 17/3225
2019/0022519 A1* 1/2019 Richards ................. G06F 3/147
2020/0032534 A1* 1/2020 Crookham ........... A63B 63/004
2020/0179786 A1* 6/2020 Vigneau ................. A63C 19/02
2020/0230493 A1* 7/2020 Richards ................. A63F 13/67
2020/0246679 A1* 8/2020 Oliveira .................. E01C 13/08
2020/0302739 A1* 9/2020 Wesson ............... G07F 17/3216
2021/0131129 A1* 5/2021 Crookham ........... A63B 63/004
2021/0154553 A1* 5/2021 Erickson ............ A63B 69/3691
2021/0205684 A1* 7/2021 Matory, III ........ A63B 24/0021
2022/0127868 A1* 4/2022 Cho .......................... E04H 3/14

* cited by examiner

130

| Entry Fee | Sport Challenge | Financial Prize |
|---|---|---|
| $10 | Hole in one | $2500 |
| $10 | Bowl three strikes | $250 |
| $10 | Kick 35 yard field goal | $500 |
| $10 | Hit target at home plate from center field | $500 |
| $10 | Make half-court basketball shot | $200 |

FIG. 2

130a

| SOCCER SPORT CHALLENGES | | |
|---|---|---|
| Entry Fee | Sport challenge | Financial Prize |
| $10 | Corner kick into goal | $40 |
| $10 | Hit target from goal kick – dropped ball | $200 |
| $10 | Hit target from goal kick – free kick | $100 |
| $10 | Score 3x penalty kicks – hit goal target | $200 |
| $10 | Hit moving target – 30 yards | $300 |

FIG. 3A

130b

| FOOTBALL SPORT CHALLENGES | | |
|---|---|---|
| Entry Fee | Sport challenge | Financial Prize |
| $10 | Kick field goal – 20 yards | $100 |
| $10 | Kick field goal – 35 yards | $500 |
| $10 | Kick field goal – 50 yards | $700 |
| $10 | Kick field goals – 20 yards, 25 yards, and 50 yards | $2500 |
| $10 | Throw 20 yards and hit target | $250 |
| $10 | Throw 30 yards and hit target | $350 |
| $10 | Kick field goal 35 yards and throw 20 yards and hit target | $1000 |

FIG. 3B

130c

| BASKETBALL SPORT CHALLENGES | | |
|---|---|---|
| Entry Fee | Sport challenge | Financial Prize |
| $10 | Make 2x free throws | $25 |
| $10 | Make 3 point shot – top of key | $40 |
| $10 | Make 3 point shot from corner (player select) | $50 |
| $10 | Make 2x 3 point shots (player select) | $200 |
| $10 | Make half-court shot | $200 |
| $10 | Make half-court shot (bank) | $250 |
| $10 | Make half-court shot (swish) | $350 |

FIG. 3C

130d

| BASEBALL SPORT CHALLENGES | | |
|---|---|---|
| Entry Fee | Sport challenge | Financial Prize |
| $10 | Hit target at home from center field | $500 |
| $10 | Hit target at second base from home | $50 |
| $10 | Catch fly ball | $40 |
| $10 | Field infield groundball and hit target at first base | $100 |
| $10 | Throw strike – 60 mph+ | $100 |
| $10 | Hit homerun | $250 |
| $10 | Catch fly ball and hit target at home from centerfield | $600 |

FIG. 3D

130e

| BOWLING SPORT CHALLENGES | | |
|---|---|---|
| Entry Fee | Sport challenge | Financial Prize |
| $10 | Bowl strike | $50 |
| $10 | Bowl spare | $25 |
| $10 | Bowl two strikes | $150 |
| $10 | Bowl three strikes | $250 |
| $10 | Pick up 7-10 split | $2500 |

FIG. 3E

130f

| SHOOTING SPORT CHALLENGES | | |
|---|---|---|
| Entry Fee | Sport challenge | Financial Prize |
| $10 | Bullseye - 10 yards | $50 |
| $10 | Bullseye – 20 yards | $100 |
| $10 | Bullseye – 30 yards | $200 |
| $10 | Bullseye – 40 yards | $300 |
| $10 | Bullseye – 50 yards | $500 |
| $10 | Moving Target – 25 yards | $250 |
| $10 | Moving Target – 50 yards | $800 |

FIG. 3F

MULTI-SPORT CHALLENGE SYSTEMS AND METHODS

CROSS-REFERENCE TO RELATED APPLICATIONS

The present application is a continuation-in-part of U.S. patent application Ser. No. 18/108,986, filed Feb. 13, 2023, which is a continuation of U.S. patent application Ser. No. 17/215,637, filed Mar. 29, 2021, now U.S. Pat. No. 11,580, 824 the contents of which are hereby incorporated herein by reference in their entirety.

TECHNOLOGY FIELD

The present disclosure is directed to multi-sport challenge systems and methods, more specifically multi-sport challenge systems and methods that combine multi-sport challenges with that include participant wagering.

BACKGROUND

Sports offer enjoyment to participants as well as spectators and act to feed the innate competitive spirit. While the particular games and the athletic feats involved have changed, sport competitions have been a part of the human experience since recorded history. Indeed, early sports were found on every inhabited continent from the Mesoamerican ballgame in North America, boxing and archery in Africa, wrestling in Europe, to Cuju in China. Sports have been used as a learning tool for survival, physical development, coordination, team building, as well as for enjoyment and an outlet to escape our everyday lives.

Modern humans typically engage in sport during youth and then slowly reduce frequency of participation as they get older and the responsibility and physical decline of adulthood take hold. Commonly, adults seek their competitive sporting outlet as spectators of sport competitions participated in by others, such as younger individuals or those few adults who successfully overcame the odds to become professional athletes. Sometimes this outlet also manifests itself in participation in wagering on the outcomes or related components of the various sport competitions participated in by others. However, many adults still have a desire to compete and evidence their athletic skill in one or more sporting feats. Such adults may participate in recreational sports in their free time in order to hone their skills, but without pay and typically without accolades. What is needed are additional athletic outlets that allow adults to evidence their athletic skills without the barriers of being signed by a professional sport team.

SUMMARY

In one aspect, a multi-sport challenge system may include a multi-sport facility, a sport challenge menu including a plurality of selectable sport challenges, and a fee/prize subsystem. The multi-sport facility may include a plurality of sport grounds, wherein each of the sport grounds includes a full, partial, or simulated sport grounds. The sport challenge menu may include an entry fee and financial prize corresponding to each selectable sport challenge of the menu, wherein the entry fee is to be paid by a participant that selects the corresponding sport challenge for an opportunity to attempt the sport challenge. The financial prize may be awarded to the participant if the attempt successfully completes the sport challenge. The fee/prize subsystem may be configured to receive sport challenge selections made by participants and to collect the corresponding entry fees from the participants and output corresponding financial prizes upon successful completion of the selected sport challenges.

In one example, the multi-sport facility includes one or more bowling lanes, par 3 golf hole, dart board, or a full or reduced size basketball court, football field, tennis court, pickleball court, paddleball court, handball court, track, or baseball field. In a further example, the multi-sport facility further includes one or more sport simulators. The one or more sport simulators include a golf simulator, shooting range simulator, a soccer simulator, a baseball simulator, a tennis simulator, a dart simulator, a paddleball simulator, a pickleball simulator, a volleyball simulator, or combination thereof.

In various applications, the entry fee may be one or more set fees, or a fee range from which participants may select. The financial prize payout available to a participant may be a fixed multiple of the entry fee known prior to the participant attempting the sport challenge. In some embodiments, the financial prize is variable as to participants such that different financial prize calculations, e.g., multiples, may apply to different participants or groups of participants. In one example, the variable for a prize payout to a successful participant may be based on a classification of the participant. The classification may be associated with variable odds that apply to the classification. Classifications may include, for instance, age group, gender, handedness (e.g., right-handed, left-handed, ambidextrous), or other classifications. Additionally or alternatively, the variable for a prize payout to a successful participant may be based, at least in part, on individual details providing specific and individualized personal odds.

In one aspect, a multi-sport challenge system includes a multi-sport challenge facility wherein participants pay an entry fee to attempt a sport challenge and win a financial prize upon successful performance of the challenge. In various applications, the entry fee may be a set fee or may be one selected by the participant from a list or within a defined entry fee range provided by the multi-sport challenge facility. The value of the financial prize may be a multiple based on the participant's success in achieving multiple of certain predetermined challenges. The financial prize may be a multiple (e.g., 0.5×, 2×, 2.4×, 4.3×, 5×) of a portion of the entry fee, which may typically be the full entry fee value. However, in some embodiments, the financial prize may be calculated by application of a multiple to value less than the entry fee, e.g., less a flat or percentage value of the entry fee. Another variation may include subtracting a flat or percentage value from an initial financial prize calculation obtained by applying a multiple to the entry fee value. The percentage may be a percentage of the entry fee or initial financial prize, for example, and represent a rake. In some embodiments, the value of the financial prize may be a multiple based on a participant's success in achieving multiple of certain predetermined challenges of a sport challenge. In one embodiment, the value of the financial prize based on a participant's success in achieving multiple challenges of a sport challenge includes successful performance of a first portion of the sport challenge setting a multiple that is applied to a multiple applicable to successful performance of a subsequent portion of the sport challenge. In this or another example, the value of an applicable multiple may be cascading such that the multiple increases or decreases based on the number of attempts the participant requires to successfully perform the sport challenge, which may include portions of a multi-challenge sport challenge.

In one aspect, a multi-sport challenge system includes a multi-sport challenge facility wherein participants pay an entry fee to attempt a sport challenge and win a financial prize. In various applications, the entry fee may be a specified set fee or may be one selected by the participant from a list or within a defined range of available entry fee values provided by the multi-sport challenge facility. The value of the financial prize may be a multiple based on a participant's success in achieving multiple of certain predetermined challenges, a multiple based on the entry fee, or both. In some embodiments, the multiple may be determined from or associated with odds. Odds may be variable with respect to participants. For example, multiple or odds may be based on certain characteristic classifications, individual details, or both with respect to participating participants. For example, the system may determine odds of success, e.g., based on historical participant performance of participants having similar characteristics or characteristics within classifications of the participant. This may incorporate difficulty of the sport challenge. As an illustrative example, participants within an age group classification of 18-39 may be associated with odds of achieving a certain sport challenge goal at 3 to 1 whereas participant within an age group classification of 40-59 may have odds of achieving the same sport challenge goal at 5 to 1, and participants within an age group classification of 60+ may have odds at 6 to 1. The system may associate these odds with variable payouts, which may be direct, such as 3× entry fee with associated 3 to 1 odds, or by degree, such as 3 to 1 odds is associated with a 2.5× payout and 6 to 1 odds are associated with a 5× payout.

In one aspect, a multi-sport challenge system includes a multi-sport challenge facility wherein participants pay an entry fee to attempt a sport challenge and win a financial prize. The payout to participants upon successful completion of the sport challenge may be a predetermined fixed value, e.g., a multiple of a portion of the entry fee or as otherwise described herein. The fixed value may vary, e.g., cascade, based on a number of attempts made by the participant to successfully perform the challenge withing a predetermined number of attempts or time period, such as a given day. In one example, the participant interacts with a sport challenge menu to select how much to pay as the entry fee, such that the prize payout also becomes a multiple of the entry fee. In one embodiment, the number of allowable attempts is limited and clearly established before the participant attempts the sport challenge. In one embodiment, the number of attempts is associated with a cascading payout value established before the participant attempts the sport challenge. Establishing the number of attempts or payout values may be provided by agreement with the multi-challenge system, which may include oral agreement, e.g., voice recognition and confirmation, signature or mark on a digital medium, such as a touch screen provided by the system or an application in communication with the system or paper. In one example, participants interact with a fee/prize subsystem to one or more of select a sport challenge, select entry fee, select sport challenge parameters, enter personal characteristics, enter personal details, pay entry fee, confirm sport challenge agreement, receive financial prize, or acknowledge financial prize. In a preferred embodiment, the payout value and calculation for the same will always be known in advance, e.g., a fixed payout value that, in some instances, may be tied to a fixed multiple, which may be static or cascading, In one aspect, a multi-sport challenge system includes a multi-sport challenge facility wherein participants pay an entry fee to attempt a sport challenge and win a financial prize. The financial prize payout to the participant may be a fixed multiple of the entry fee. The entry fee may be fixed or may be within a predefined range from which participants may select a desired entry fee. The financial prize payout for successful completion of the sport challenge may be based on a multiple specified by a designated classification of a characteristic of the participant. In some embodiments, odds of successfully performing the sport challenge may be determined on a per participant basis. Classifications may specify variable odds based on, for example, age bracket, gender, handedness, or other group classification. Other classifications may include height and/or weight group.

In one aspect, a multi-sport challenge system includes a multi-sport challenge facility wherein participants pay an entry fee to attempt a sport challenge and win a financial prize. The financial prize payout to a participant may be fixed multiple of the entry fee. The entry fee may be one or more predefined fee values or may be within a predefined range of entry fee values specified by the multi-sport challenge system. The multiple applied to the entry fee to determine the financial prize payout to the successful participant may be based on individual details of the participant, which may be very specific and individualized, personal odds. In some embodiments, odds of successfully performing the sport challenge may be determined on a per participant basis. Individual details may include one or more of the specific age, height, weight, previous sport experience, prior participation in the same, similar, or other sport challenges, or other individual details.

In one aspect, a multi-sport challenge system includes a multi-sport challenge facility that sets the odds of success in achieving or successfully performing a sport challenge on a per participant basis such that participants in the respective sport challenges compete with one another and wager on their activities by and among each other utilizing the odds set forth by the facility.

In one aspect, a multi-sport challenge system includes a multi-sport challenge facility wherein participants who attempt to achieve or successfully complete certain sport challenges wager on their activities by and among each other. The multi-sport challenge system acts as a marketplace for such peer-to-peer wagers. The multi-sport challenge system may collect a fee for use of the sport challenge facility. In some embodiments, odds of successfully performing the sport challenge may be included. For example, odds may be determined on a per participant basis by the facility or may be specified by the participants.

In one aspect, a multi-sport challenge system includes a multi-sport challenge facility wherein participants who attempt to achieve or successfully complete certain sport challenges may wager on their activities by and among each other. The multi-sport challenge system acts as a marketplace for such peer-to-peer wagers. The multi-sport challenge system may collect a flat fee or a percentage of the amount wagered or awarded as a financial prize for acting as the facilitator of the wager. The multi-sport challenge system collects a fee for use of the sport challenge facility. In some embodiments, odds of successfully performing the sport challenge may be included. For example, odds may be determined on a per participant basis by the facility or may be specified by the participants.

In one aspect, a multi-sport challenge system includes a multi-sport challenge facility wherein participants who attempt to achieve or successfully complete certain sport challenges may wager on their activities by and among each other. The multi-sport challenge system acts as a marketplace for such peer-to-peer wagers. The multi-sport challenge system collects a percentage of the wager for acting as facilitator of the wager. In some embodiments, odds of successfully performing the sport challenge may be included. For example, odds may be determined on a per participant basis by the facility or may be specified by the participants.

In one aspect, a multi-sport challenge system includes a multi-sport challenge facility that facilitates the entry of an agreement between two or more participating parties in the same or different sport challenge wherein the multi-sport challenge system determines and sets the odds of success in achieving or successfully performing a particular sport challenge. The odds may serve as the basis for the wagering activity of the participants. Odds may be determined on a per participant basis, which may include characteristic classifications, individual details, or combination thereof.

In one aspect, a multi-sport challenge system includes a multi-sport challenge facility that facilitates the entry of an agreement between two or more people participating in the same or different sport challenges whereby the participating parties in the agreement determine and set the odds of success in achieving or successfully performing a particular sport challenge. The odds may serve as the basis for the wagering activity of the participants.

In one aspect, a multi-sport challenge system includes a multi-sport challenge facility that facilitates the entry of an agreement between two or more participant parties whereby one participant participates in one or more sport challenges and the participant parties in the agreement (i) determine and set the odds of success in achieving or successfully performing a particular sport challenge(s) or (ii) utilize the odds set by the facility for the individual person participating in the challenge(s), wherein odds serve as the basis for the wagering activity of the persons entering into the agreement

BRIEF DESCRIPTION OF THE DRAWINGS

The novel features of the described embodiments are set forth with particularity in the appended claims. The described embodiments, however, both as to organization and manner of operation, may be best understood by reference to the following description, taken in conjunction with the accompanying drawings in which:

FIG. 2 is a menu listing various sport challenges of an exemplary multi-sport challenge system according to various embodiments described herein; and FIGS. 3A-3F show exemplary sport specific menus of a multi-sport challenge system according to various embodiments described herein.

DESCRIPTION

Figure 1:
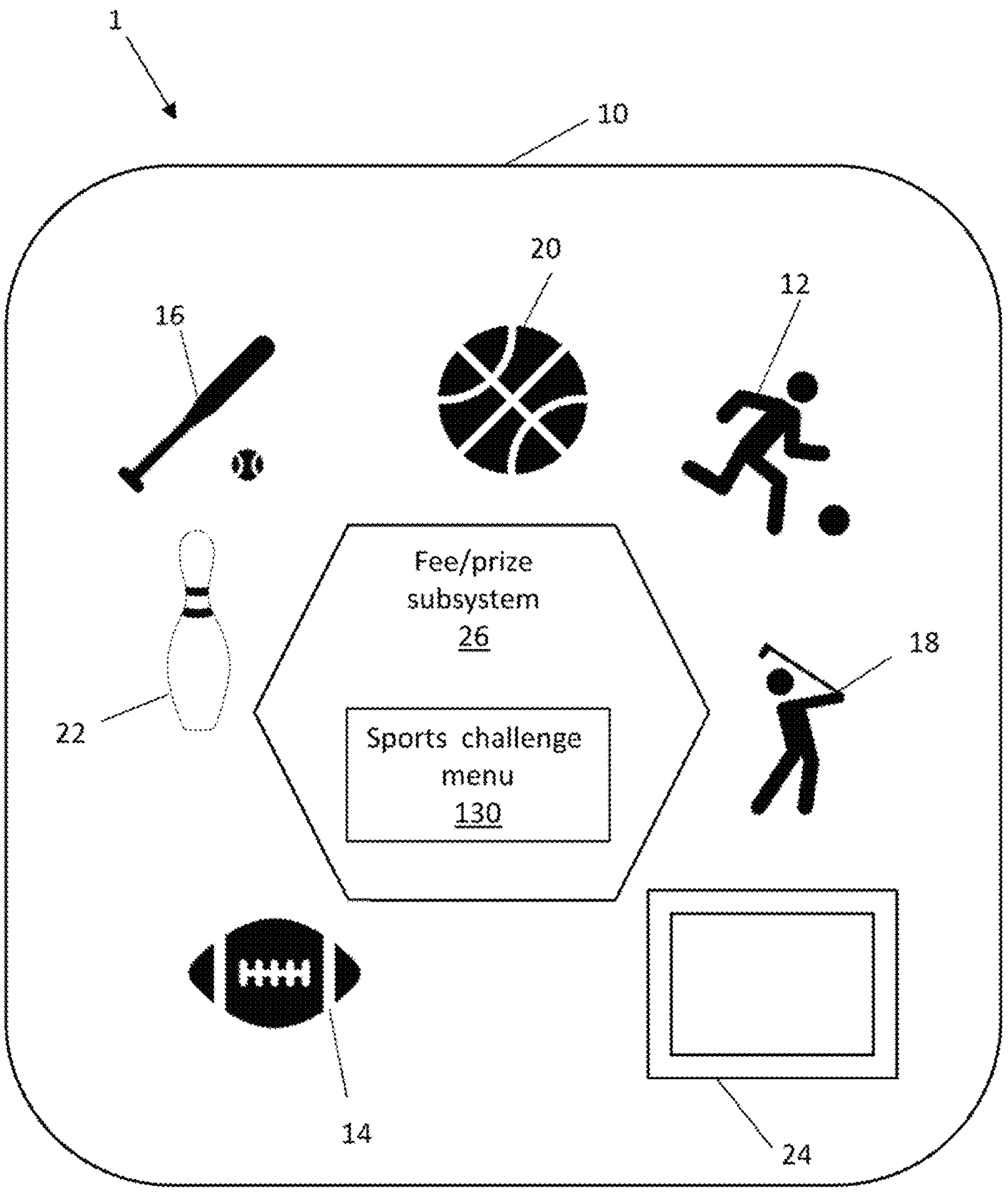
FIG. 1 schematically illustrates an exemplary multi-sport facility of a multi-sport challenge system according to various embodiments described herein.

The present disclosure describes a multi-sport challenge system and methods of conducting multi-sport challenges. FIGS. 1-3F illustrate features of various embodiments of the multi-sport challenge system wherein like numbers reference like features.

With reference to FIG. 1, the multi-sport challenge system 1 may include a multi-sport facility 10 housing a plurality of sport grounds or portions thereof whereon participants may attempt various sport challenges. The sport grounds may include one or more fields such as a soccer field 12, football field 14, or baseball field 16, golf hole 18, one or more courts such as a basketball court 20, tennis court, or jai alai court, hockey rink, bowling lane 22, gym/weights, track, or the like. In one example, the facility may include a multi-sport complex including multiple sporting grounds selected from a bowling lane 22, a golf hole 20, e.g., a par 3 golf hole, basketball court 16, football field 14, baseball field 18, shooting range, and soccer field 12. Additional and/or alternate sport grounds may also be included.

In one embodiment, one or more of the sport grounds may be reduced in size. For example, the multi-sport facility 10 may include a reduced size soccer field 12 (e.g., goal, quarter field, half field), a reduced size football field 14 (e.g., goalposts/uprights and 20 to 50 or more yards of field), a reduced size baseball field 16 (e.g., an infield, an outfield, an infield and partial outfield, an outfield and partial infield, a pitcher's mound and home plate, or a wedge section of the field taken from home plate), and/or a reduced size basketball court 20 (e.g., half court).

In some embodiments, the multi-sport facility 10 may include alternative sport grounds comprising one or more sport simulators 24 in addition to or instead of one or more of the traditional sport grounds such as a golf simulator, shooting range simulator, soccer simulator, or baseball simulator. Simulators 24 typically use various tracking technology such as infrared or camera detection to track movements of the user and/or sport implement, e.g., body part, ball, puck, bat, club, gun, etc. Simulators 24 may also include display screens in which users may interact with respect to the sporting environment being simulated. Example simulators 24 may include golf simulators including launch monitors and/or simulation programs manufactured by Foresight Golf, LLC, Boerne, TX; TruGolf, Inc., Centerville, UT; TrackMan, Inc., Stamford, CT; SkyTrak, LLC, Winston Salem, NC; or Full Swing Golf Inc., San Diego, CA. Example simulators 24 for additional sports may include simulators 24 such as TRUGOLF™ Multisport Simulator (baseball, hockey, soccer, footgolf), manufactured by TruGolf, Inc. or Full Swing MultiSport Simulators manufactured by Full Swing Golf Inc., San Diego, CA (handgun or rifle shooting, baseball hitting or pitching, soccer kicking or goal shooting, football passing or kicking, basketball goal shooting, lacrosse goal shooting, hockey goal shooting, golf, among others).

In various embodiments, the multi-sport challenge system 1 includes the multi-sport facility 10 configured to provide a plurality of sport challenges with respect to the sport grounds available to participants in which an entry fee is paid for the opportunity to win a financial prize upon successful completion of one or more of the available sport challenges. For example, the multi-sport challenge system 1 may include 8 or more, such as greater than 10, greater than 12, greater than 15, greater than 20, or greater than 25 sport challenges that may be available to participants that all include an entry fee to win a financial prize comprising a specific dollar amount upon successful completion of an entered sport challenge. Such a multi-sport challenge system and facility may allow participants to pay entry fees for one or more selected challenges to win a pre-determined amount by successfully completing the sport challenge. An entry fee may provide the participant a single attempt to successfully complete a specified sport challenge to receive the financial prize. In some embodiments, the choice of challenges may be selectable by participants from a list, which may be provided by the sports challenge menu 130. The entry fees may be the same or different based on the challenge selected or the number of challenges selected in a multi-challenge sport challenge. In some embodiments, the entry fee is fixed such that the entry fee paid is initially set as an amount risked and does not change with respect to the opportunity to attempt the challenge, which in some instances may be multiple individual challenges as part of a multi-challenge, for the chance to earn the financial prize. As described in more detail below, various embodiments may include enhancers that increase relative difficulty of the sport challenge, e.g., multiple successful attempts, greater distance or speed, smaller target, etc.

The multi-sport challenge system 1 may include a fee/prize subsystem 26 configured to receive entry fees for the various sport challenges and distribute financial prizes upon successful completion of sport challenges subject to the entry fee. In some embodiments, the fee/prize subsystem 26 may include a physical building or structure within the multi-sport facility 10 where participants may select sport challenges, pay entry fees, and receive financial prizes upon successful completion of sport challenges. As described in more detail below, in one embodiment, the fee/prize subsystem 26 may be partially or substantially automated. For example, the fee/prize subsystem 26 may include a processor and memory storing instructions executable by the processor for performing the operations of the fee/prize subsystem 26.

As introduced above, the multi-sport challenge system may incorporate various sport challenges. Participants may compete in the sport challenges at the multi-sport facility on full or modified sized fields, courts, grounds, etc. and/or simulators. Those having skill in the art will appreciate that, for brevity and clarity, and unless indicated otherwise, challenge is used herein to reference a single discrete challenge or a multi-challenge including multiple goals in same or different challenge events using one or more sports grounds. For example, a participant may attempt a discrete challenge on a sports ground such as a full, partial, or simulated baseball field that may include throwing a ball from a specified location and hitting a target or multiple targets with the ball one or more times, within a specified period of time, or combination thereof. In an example of a challenge including a multi-challenge, the challenge may include a full, partial, or simulated football field including uprights and the participant successfully kicking a football through the uprights from one or more locations, and a full, partial, or simulated soccer field including a target such as a goal and the participant kicking a soccer ball and successfully placing the ball with respect to the target. Various sport challenges may comprise hitting a target, which may include a marker, board, area of a field or court, target area or range, soccer goal, strike zone, football uprights, hole in a cornhole board, bowling pins, or other target, with a sports implement, such as a football, baseball, baseball bat, soccer ball, tennis ball, tennis racket, paddle ball, paddle ball paddle, pickleball, pickleball paddle, volleyball, dart, bowling ball, or other ball or sports implement. Depending on the sports challenge, this may include hitting the target or otherwise achieving the goal, e.g., scoring a goal, bowling a strike, kicking a football through uprights, performing a regulation serve, or hitting a bullseye, within in a specified number of attempts, a specified number of times in a row, and/or within a specified period of time. As a further example, multiple targets may be provided that are worth a predefined number of points wherein the sports challenge comprises obtaining a specified score or above or below a specified score within a specified number of attempts or within a specified period of time. For example, hitting a golf ball a specified distance or within a specified distance range may be worth a predetermined number of points and hitting the golf ball a greater distance may be worth a larger number of predetermined points. Points may similarly be associated with different ball speeds in baseball throwing or hitting sport challenges. In various examples of competitive sport challenges, the financial prize may be awarded to the participant that scores the most soccer goals, basketball goals, strikes, field goals, targets hit, scores the most or least points, or specific combinations or associated targets or points with respect to the forgoing in the least amount of tosses, in a row, and/or within a specified period of time. Thus, a sport challenge comprising a participant successfully tossing a bag through a hole in a corn hole board may include awarding the financial prize to the participant that tosses the most bags into the hole in a cornhole board in the least amount of tosses, in a row, and/or within a specified period of time.

In various embodiments, the multi-sport challenge system includes soccer related sport challenges. Soccer related sport challenges may include scoring a penalty kick or corner kick goal against a goalie or hitting a target from a penalty line or corner; successfully blocking a shot on goal; performing a goal kick, e.g., an indirect free kick or dropped ball, and hitting a stationary or moving target, target area, or achieving a specified distance. In some embodiments, a soccer related sport challenge may comprise successfully kicking a soccer ball into a soccer goal, hitting a target, or both, e.g., hitting a smaller target within a soccer goal. For instance, a sport challenge may include kicking one or more goals and/or hitting one or more targets within a specified number of attempts, a specified number of times in a row, and/or within a specified period of time. Additional requirements of the soccer challenges or soccer challenge enhancers may include performing the challenge while applying a predetermined curvature on the ball, successful completion of a multiple or a specified soccer related sport challenge or multiple soccer related sport challenges, e.g., successful completion of a parlay of two or more of the sport challenges. The above or other soccer related sport challenges may be performed on a full or partial soccer field and/or utilizing a soccer simulator of the multi-sport facility.

In one embodiment, a soccer related sport challenge may be provided as competitive sport challenge, such as peer-to-peer competition wagering, as described herein. The competitive sport challenge may match two or more participants against one another in a soccer related challenge, such as those above, whereby the winner is the participant or group of participants that successfully complete the sport challenge. In one example, the winner is the participant or group of participant that perform the sport challenge to a greater degree, such as higher score, more goals or more targets hit in a row, most goals within a set number of kicks or a set period of time, score on another participant playing in goal, or as otherwise determined at the outset of the challenge. The payout may be a multiple of the entry fee, which may be variable, such as a multiple, based on odds as described herein, or may be parimutuel based on the entry fees of the participants, odds, or both, as examples. As described in more detail below, in some embodiments, participants in a competitive sport challenge may be assigned different odds, such as variable odds described herein based on classification, individual characteristics, or combination thereof. Participants may compete in the same or different soccer related sport challenge or sport challenges related to different sports.

In some embodiments, the multi-sport challenge system includes football-related sport challenges. Football related sport challenges may include successfully kicking an extra point; kicking a field goal; passing a football and hitting a stationary or moving target or area; punting a football a specified distance and/or to a specified location; or catching a punt or kickoff. Field goals, passing distances, or punting distances may include various distances such as 10 yards, 15 yards, 20 yards, 25 yards, 30 yards, 35 yards, 40 yards, 45 yards, 50 yards, or more. In some embodiments, a football related sport challenge may comprise successfully kicking a football through football uprights. For instance, the sport challenge may include kicking one or more field goals or series of field goals within a specified number of attempts, a specified number of times, a specified number of times in a row, and/or within a specified period of time. In some embodiments, a football related sport challenge may comprise successfully throwing a football and hitting a target. For instance, the sport challenge may include hitting one or more targets or series of targets within specified number of number of attempt times, a specified number of times, a specified number of times in a row, and/or within a specified period of time. As a further example, the field goals or targets may be worth a predefined number of points and the sports challenge may require obtaining a specified score within a specified number of attempts or within a specified period of time. Additional requirements of the football related sport challenges or football related sport challenge enhancers may include successful completion of a multiple of a selected football related sport challenge, e.g., consecutively, or multiple football related sport challenges, e.g., successful completion of a parlay of two or more of the football related challenges. In one example, a football related sport challenge includes making multiple successful passing attempts or a specified number of successful throws to a target or target area. In one example, a football related sport challenge includes successfully kicking field goals from two or more distances or successfully hitting a target or target area in succession. The above or other football related sport challenges may be performed on a full or partial, e.g., 50 yard, football field and/or using a football simulator of the multi-sport facility.

In various embodiments, a football-related sport challenge may be provided as a competitive sport challenge, such as peer-to-peer competition wagering, as described herein. The competitive sport challenge may match two or more participants against one another in a football-related challenge, such as those above, whereby the winner is the participant or group of participants that successfully complete the sport challenge. In one example, the winner is the participant or group of participant that perform the sport challenge to a greater degree, such as longest field goal kicked, most field goals kicked within a set number of kicks or a set period of time, most consecutive field goals from one distance or successive distances, farthest target hit, smallest target hit, higher score based on targets hit with a set number of throws or within a set period of time, most targets hit in a row, or as otherwise determined at the outset of the challenge. The payout may be a multiple of the entry fee, which may be variable, such as a multiple, based on odds as described herein, or may be parimutuel based on the entry fees of the participants, odds, or both, as examples. As described in more detail below, in some embodiments, participants in a competitive sports-based challenge may be assigned different odds, such as variable odds described herein based on classification, individual characteristics, or combination thereof. Participants may compete in the same or different football related sport challenge or sport challenges related to different sports.

In various embodiments, the multi-sport challenge system includes basketball related sport challenges. Basketball related sport challenges may include hitting one or more shots from one or more specified locations of a basketball court such as half-court, 3 point (e.g., top of the key, corner, or participant choice), or free throw. In some embodiments, a basketball related sport challenge may comprise successfully shooting a basketball through a basketball goal from one or more specified locations of a basketball court. For instance, the sport challenge may include scoring one or more three-point shots, free throws, dunks, or other specified shots or combination thereof within a specified number of attempts, in a row, and/or within a specified period of time. Additional requirements of the basketball related sport challenges or basketball related sport challenge enhancers may include hitting basketball shots in a specified manner, such as a swish, bank, no backboard, or successful completion of a multiple of a selected basketball related sport challenge or multiple basketball related sport challenges, e.g., successful completion of a parlay of two or more of the basketball related sport challenges. The above or other basketball related sport challenges may be performed on a full or partial, e.g., half-court, basketball court and/or using a basketball simulator of the multi-sport facility.

In some embodiments, a basketball related sport challenge may be provided as competitive sport challenge, such as peer-to-peer competition wagering, as described herein. The competitive sport challenge may match two or more participants against one another in a basketball related challenge, such as those above, whereby the winner is the participant or group of participants that successfully complete the sport challenge. In one example, the winner is the participant or group of participants that perform the sport challenge to a greater degree, such as higher score in match play with other participants, longest 3 point shot, most consecutive shots made, most shots made from a specified area of the court within a set number of shots, most consecutive free throws or shots made within a set number of shots, most consecutive 3 point shots, most 3 point shots made within a set number of shots or set period of time, longest shot made within a set number of shots or within a set period of time, or as otherwise determined at the outset of the challenge. The payout may be a multiple of the entry fee, which may be variable based on odds as described herein, or parimutuel based on the entry fees of the participants, odds, or both, as examples. As described in more detail below, in some embodiments, participants in a competitive sports-based challenge may be assigned different odds, such as variable odds described herein based on classification, individual characteristics, or combination thereof. Participants may compete in the same or different basketball related sport challenge or sport challenges related to different sports.

In some embodiment, the multi-sport challenge system includes baseball related sport challenges. Baseball related sport challenges may include participants utilizing a full or partial baseball field or simulator. In some embodiments, a baseball related sport challenge may comprise successfully throwing a baseball from an area of the field and hitting a target. For instance, throwing a baseball from a pitcher's mound and hitting a target and/or obtaining a ball speed at or above a specified speed. In some examples, hitting the target, ball speed, or both may further include doing so a specified number of times, a specified number of times in a row, within a specified number of throws, and/or within a specified period of time. A baseball related sport challenges may comprise successfully throwing a baseball from the outfield toward home plate or a base and hitting a target located near the home plate or base. In some examples, hitting the target, ball speed, or both may further include doing so a specified number of times, a specified number of times in a row, within a specified number of throws, and/or within a specified period of time. A baseball related sports challenge may comprising successfully hitting an actual or simulated baseball with a bat for a homerun. Additional aspects may include hitting the baseball having a specified ball speed or range or ball speed or greater. This may be an enhancer or may be part of a homerun sports challenge or sports challenge requiring the participant to merely hit the ball in play or to a specified area of the field. In some examples, sport challenges comprising hitting a baseball in play, for a homerun, to a certain area of the field may further include doing so a specified number of times, a specified number of times in a row, within a specified number of throws, and/or within a specified period of time. Example baseball related sport challenges may include participants throwing a baseball from an outfield location, e.g., center-field, and hitting a target at home plate, throwing out of a crouch from a home plate location and hitting a target at second base, throwing from an infield position and hitting a target at first base. In a further example, baseball related sport challenges may include or be enhanced to include fielding the ball before throwing at the target and/or hitting the target within a specified time from when the ball is mechanically or manually hit or thrown to the participant, e.g., from home plate or a pitcher's mound or hits the participant's mitt. Additional examples of baseball related sport challenges may include throwing a strike from a pitcher's mound or throwing a breaking ball having a predetermined distance or range of distance of break. The pitch may be required to be a strike, which may be an enhancer to increase the financial prize for successfully completing the challenge. Further examples, may include fielding a ground ball, catching a fly ball, hitting a grounder, popup, homerun, or line drive, or stealing a base or breaking for a base steal with enough time to beat a predetermined timed throw at a predetermined foot speed, or to a particular side of the field. In one configuration, a baseball related sport challenge or an enhancer to a hitting related sport challenge may require the participant to hit a baseball to a particular area of the field. In one example, baseball related sport challenges may include or be enhanced for successful completion of multiple baseball related sport challenges, e.g., successful completion of a parlay of two or more of the baseball related sport challenges. The above or other baseball related sport challenges may be performed on a full or partial baseball field and/or using a baseball simulator of the multi-sport facility.

In some embodiments, a baseball related sport challenge may be provided as competitive sport challenge, such as peer-to-peer competition wagering, as described herein. The competitive sport challenge may match two or more participants against one another in a baseball related challenge, such as those above, whereby the winner is the participant or group of participants that successfully complete the sport challenge. In one example, the winner is the participant or group of participant that perform the sport challenge to a greater degree, such as most targets hit, fastest pitch, longest hit, most consecutive hits or homeruns, most hits landing or targets hit within a specified area, most targets hit from a specified area of the field within a set number of throws or within a set time period, getting a hit or homerun off a competing participant's pitch, striking out a competing participant, longest homerun, or as otherwise determined at the outset of the challenge. The payout may be a multiple of the entry fee, which may be variable, such as a multiple, based on odds as described herein, or may be parimutuel based on the entry fees of the participants, odds, or both, as examples. As described in more detail below, in some embodiments, participants in a competitive sports-based challenge may be assigned different odds, such as variable odds described herein based on classification, individual characteristics, or combination thereof. Participants may compete in the same or different baseball related sport challenge or sport challenges related to different sports.

In various embodiments, the multi-sport challenge system includes golf related sport challenges. Golf related sport challenges may include participants utilizing a golf hole, e.g., a par 3 hole, green, range, fairway, simulator, or the like. For example, participants may pay an entry fee for an opportunity to win a financial prize for landing a ball on a green; landing the ball on the green a particular distance from the hole; landing the ball on the green with a particular amount, direction, or range of roll; or holing the ball. The multi-sport facility 10 may include a fairway or golf simulator wherein participants pay an entry fee for a sport challenge that includes achieving a 200, 250, 300, or 350 yard drive. In order for distance to be accepted, the ball may be required to land or ultimately come to rest in a fairway or other specified location, such as on a green area. In one example, location of rest may be available as an enhancer to increase the financial prize for successfully completing the sport challenge. Other golf related sport challenges may include accuracy or distance using other clubs such as irons, hybrids, or non-driving woods. In some examples, golf sport challenges may include imparting a draw or fade ball flight, which in some instances may be applied as an enhancer to a distance or accuracy-based golf sport challenge. In some embodiments, a golf related sport challenge may comprise successfully hitting a golf ball from a tee box of a golf hole and scoring a hole-in-one or positioning the golf ball within a specified distance from a golf hole. For instance, the sports challenge may include hitting the hole-in-one within a specified number of shots or within a specified period of time. In a further instance, the sports challenge may include positioning one or more balls within the specified distance or in one or more specified locations, a specified number of number of times, a specified number of times in a row, within a specified number of shots, and/or within a specified period of time. Additional requirements of golf related sport challenges or golf related sport challenge enhancers may include completion of a multiple of a specified challenge or multiple different golf related challenges, e.g., successful completion of a parlay of two or more of the golf related challenges. The above or other golf related sport challenges may be performed on a full or partial golf hole and/or using a golf simulator of the multi-sport facility.

In some embodiments, a golf related sport challenge may be provided as competitive sport challenge, such as peer-to-peer competition wagering, as described herein. The competitive sport challenge may match two or more participants against one another in a golf related challenge, such as those above, whereby the winner is the participant or group of participants that successfully complete the sport challenge. In one example, the winner is the participant or group of participant that perform the sport challenge to a greater degree, such as higher score in match play with other participants, longest drive, most consecutive putts made or shots made within a set area, most putts or shots made to a set area of a hole within a set number of putts or shots or within a set period of time, most shots landed in designated areas of a hole, closest to a pin or target, or as otherwise determined at the outset of the challenge. The payout may be a multiple of the entry fee, which may be variable, such as a multiple, based on odds as described herein, or may be parimutuel based on the entry fees of the participants, odds, or both, as examples. As described in more detail below, in some embodiments, participants in a competitive sports-based challenge may be assigned different odds, such as variable odds described herein based on classification, individual characteristics, or combination thereof. Participants may compete in the same or different golf related sport challenge or sport challenges related to different sports.

In some embodiments, the multi-sport challenge system includes bowling related sport challenges. In some embodiments, a bowling related sport challenge may comprise successfully bowling a ball down the bowling lane to score a strike. For instance, the sports challenge may include scoring one or more strikes a specified number of number of times, a specified number of times in a row, within a specified number of bowls, and/or within a specified period of time. Example bowling related sport challenges may include achieving a number of strikes in a row, achieving a number of spares in a row, achieving a combination of strikes and/or spares in a row, achieving a specified combination or series of strikes and spares, achieving a particular pin combination knocked down or remaining, or successfully picking up a specified split, e.g., 7-10, 8-10, 3-7, 7-9, 4-6-7-10, 3-7-10, 3-10, 5-7, etc. Additional requirements of bowling related sport challenges or bowling related sport challenge enhancers may include performing the sport challenge while applying a specified curvature to the bowling ball or initiating the roll at a specified location or area of the lane, successful completion of a multiple of a selected bowling related sport challenge or multiple bowling related sport challenges, e.g., successful completion of a parlay of two or more of the bowling related challenges. The above or other bowling related sport challenges may be performed on a full or partial bowling lane and/or using a bowling simulator of the multi-sport facility.

In some embodiments, a bowling related sport challenge may be a competitive sport challenge, such as peer-to-peer competition wagering, as described herein. The competitive sport challenge may match two or more participants against one another in a bowling related sport challenge, such as those above, whereby the winner is the participant or group of participants that successfully complete the bowling related sport challenge. In one example, the winner is the participant or group of participants that performs the bowling related sport challenge to a greater degree, such as higher scoring, more strikes in a row, or as otherwise determined at the outset of the challenge. The payout may be a multiple of the entry fee, which may be variable, such as a multiple, based on odds as described herein, or may be parimutuel based on the entry fees of the participants, odds, or both, as examples. As described in more detail below, in some embodiments, participants in a competitive sports-based challenge may be assigned different odds, such as variable odds described herein based on classification, individual characteristics, or combination thereof. Participants may compete in the same or different bowling related sport challenge or sport challenges related to different sports.

In various embodiments, the multi-sport challenge system includes cornhole related sport challenges. In one example, the multi-sport challenge facility includes one or more cornhole grounds, each including one or more cornhole boards, associated with one or more cornhole sport challenges. A cornhole sport challenge may include converting one or more successful throws as defined by the terms of the sport challenge. A successful throw may include tossing a bag such that the bag positions in the hole, a portion of the bag hangs over the hole, the bag positions within a predefined proximity to the hole, bag stacking, or combination thereof. Bag stacking may include successfully positioning a bag on a subsequent toss on top of all or a portion, as defined by the participants or system, of a bag from a previous toss by the same participant or another participant competing with the participant. In some embodiments, a number of consecutive successful throws, portion of bag hang, proximity distance, portion off bag or number of stacked bags may be included in the sport challenge. Such criteria may be defined by the sport challenge participants or system and, in one embodiment, may be associated with a variable odds calculation such that a consecutive number of successful tosses in the hole, hang, proximity, or stack are included as criteria for successful performance of the challenge or may be included as a fixed amount enhancer or enhancer multiplier from which the financial prize is calculated, e.g., from the entry fee amount. In one embodiment, a cornhole sport challenge includes the participant converting a baseline number of consecutive successful throws in a row, wherein a successful throw corresponds to a bag being thrown through the hole or “cornhole” of a cornhole board.

In some embodiments, a cornhole related sport challenge may be provided as competitive sport challenge, such as peer-to-peer competition wagering, as described herein. The competitive sport challenge may match two or more participants against one another in a cornhole related sport challenge, such as those above, whereby the winner is the participant or group of participants that successfully complete the sport challenge. In one example, the winner is the participant or group of participants that perform the sport challenge to a greater degree, such as higher scoring, more holes in a row, or as otherwise determined at the outset of the challenge. The payout may be a multiple of the entry fee, which may be variable, such as a multiple, based on odds as described herein, or may be parimutuel based on the entry fees of the participants, odds, or both, as examples. As described in more detail below, in some embodiments, participants in a competitive sports-based challenge may be assigned different odds, such as variable odds described herein based on classification, individual characteristics, or combination thereof. Participants may compete in the same or different cornhole related sport challenge or sport challenges related to different sports.

In various embodiments, the multi-sport challenge system includes shooting related sport challenges. Example shooting related sport challenges may include striking a target with a projectile, e.g., bullet, dart, BB, pellet, paintball, or arrow, shot from a rifle, handgun, bow, or crossbow, for example. One or more targets may be set up. Targets may include traditional bullseye type targets or may include objects such as animal figures or locations identified on objects. Sport challenges may include hitting a number of bullseyes or most bullseyes in a row. Challenges may include hitting a predefined set of targets, series of targets, in gross or in a predefined order. Additional requirements of shooting related sport challenges or shooting related sport challenge enhancers may include time to aim and fire the projectile, successful completion of multiple hits to a target or multiple targets or locations within a target. Shooting related sport challenges or enhancers may include distances from the target the participant must shot from and/or target motion. The above or other shooting related sport challenges may be performed on a full or partial range and/or using a firing range or target simulator of the multi-sport facility.

In various embodiments, a shooting related sport challenge may be provided as competitive sport challenge, such as peer-to-peer competition wagering, as described herein. The competitive sport challenge may match two or more participants against one another in a shooting related challenge, such as those above, whereby the winner is the participant or group of participants that successfully complete the sport challenge. In one example, the winner is the participant or group of participant that perform the sport challenge to a greater degree, such as higher score in match play with other participants, longest 3 point shot, most consecutive shots made, most shots made from a specified area of the court within a set number of shots, most consecutive free throws or shots made within a set number of shots, most consecutive 3 point shots, most 3 point shots made within a set number of shots or set period of time, longest shot made within a set number of shots or within a set period of time, or as otherwise determined at the outset of the challenge. The payout may be a multiple of the entry fee, which may be variable, such as a multiple, based on odds as described herein, or may be parimutuel based on the entry fees of the participants, odds, or both, as examples. As described in more detail below, in some embodiments, participants in a competitive sports-based challenge may be assigned different odds, such as variable odds described herein based on classification, individual characteristics, or combination thereof. Participants may compete in the same or different basketball related sport challenge or sport challenges related to different sports.

Additionally, alternatively, or in combination with one or more of the above, the multi-sport challenge system may include sport challenges related to other sports. For example, the other sport challenges may include volley relates sport challenges such as those related to volleyball, footvolley, 27 peak takraw, tennis, pickleball, or paddleball. For instance, sport challenges may require participants to successfully serve, return, or spike the ball to a target or area. In some embodiments, a tennis related sport challenge may comprise successfully serving a tennis ball to a target location. For instance, the sports challenge may include executing a regulation serve within a specified number of number of attempts, a specified number of times, a specified number of times in a row, and/or within a specified period of time. The sports challenge may also include doing so at or greater than a specified ball speed or range of ball speeds. A full or partial tennis, pickleball, paddleball or volleyball grounds may correspond to sport challenges including executing a successful service for a speed, speed range, or exceeding a baseline speed. Additionally or alternatively, the serve may include accuracy such as hitting targets within the service box. Still other sport challenges may include one or more sport related challenges selected from hockey related sport challenges, e.g., hitting a target with a puck along ice while on skates; pool related sport challenges, e.g., hitting a specified pool shot, combo, breaking a rack while hitting a specified ball or combination of balls into one or more pockets; darts related sport challenges, e.g., hitting a specified location, bull, bullseye, or combination of locations on a dart board to achieve a specified numerical score; climbing related sport challenges, e.g., climbing a climbing wall withing a specified period of time; frisbee golf related sport challenges, e.g., hitting a hole-in-one; and card or cup stacking sports related challenges, e.g., stacking a specified stacking configuration one or more times within a specified period of time; Olympic sports such as track and field, e.g., jumping a specified distance or height, running a specified distance in a specified period of time, hurling a discus or javelin or putting a shot a specified distance.

In various embodiments, as above, various other sports related sport challenges may be provided as competitive sport challenge, such as peer-to-peer competition wagering, as described herein. The competitive sport challenge may match two or more participants against one another in a sport challenge, such as those above, whereby the winner is the participant or group of participants that successfully complete the sport challenge. In one example, the winner is the participant or group of participant that perform the sport challenge to a greater degree, such as most bullseyes, most consecutive bullseyes, fastest serve, most accurate serve, most serves to a specified area of the court within a set number of shots, most consecutive serves, successful return or most successful returns of a competing participant serve, longest jump, fastest run time, most weight lifted, closest to a target, most targets hit or shots made within a set number of shots, most consecutive targets, or as otherwise determined at the outset of the challenge. The payout may be a multiple of the entry fee, which may be variable, such as a multiple, based on odds as described herein, or may be parimutuel based on the entry fees of the participants, odds, or both, as examples. As described in more detail below, in some embodiments, participants in a competitive sports-based challenge may be assigned different odds, such as variable odds described herein based on classification, individual characteristics, or combination thereof. Participants may compete in the same or different related sport challenge or sport challenges related to different sports.

As introduced above, the multi-sport challenge system may include multi-sport challenge wagering. Wagering may include participants wagering on their ability to successfully complete a sport challenge. In various embodiments, participants may pay an entry fee for an opportunity to perform one or more sport challenges for an opportunity to win a financial prize. With reference to FIG. 2, an example sport challenge menu 130 of selectable sport challenges that may be available to participants of the multi-sport challenge system may include paying a $10 entry fee for the opportunity to make a hole in one with a $2,500 prize, to bowl three strikes in a row for a $250 prize, to kick a 35 yard field goal for a $500 prize, to throw from centerfield to home plate to hit a target for a $500 prize, or to make a half-court basketball shot for a $200 prize.

In the illustrated example, entry fees are shown as being uniform and the prize amounts varied. Additionally or alternatively, different entry fees may be paid for the opportunity to win a uniform amount from a plurality of different sport challenges. Additionally or alternatively, entry fees for the opportunity to attempt particular sport challenges may be the same or different and the financial prize for successful completion of the sport challenges may be the same or different.

The financial prize amount for successful completion of the sport challenge may be fixed prior to or at the time of entry fee payment. In one embodiment, the financial prize may be predetermined based on an entry fee amount. For example, a higher entry fee may be paid to increase the financial prize. In some embodiments, a participant may enter an enhanced sport challenge that changes the requirements for winning the sport challenge in way that increases difficulty or decreases probability of successfully completing the sport challenge to increase the financial prize associated with the sport challenge. Enhancers may be time related, such as an increase or decrease in time in which the sport challenge must be successfully completed. Enhancers may be distance related such as increase or decrease in a distance of an objective of the sport challenge, e.g., a target or target area, goal, basket, or other objective of a sport challenge. Enhancers may be motion related such that an objective of the sport challenge, such as a target, goal, or basket, is in motion during the attempt. Enhancers may be speed related such that a target, ball, or participant must obtain, remain below or above, or maintain a particular speed or range of speed as part of the sport challenge. Enhancers may be series related such that multiple objectives such as targets, goals, or baskets must be hit in series or within a number of attempts. Enhancers may also include a combination of multiple enhancers. Enhancers may increase financial prizes by a predetermined same or different amount as applied to one or more selectable sport challenges. In one example, each enhancer may be associated with a multiplier such as 1.1, 1.5, 2, 2.5, etc., that may be multiplied by a base financial prize associated with a sport challenge to which it applies.

In one embodiment, a multi-sport challenge system 1 includes a multi-sport facility 10 whereby participants pay an entry fee to attempt a sport challenge and win a financial prize upon successful completion of one or more challenges. The payout to the participant by the multi-sport challenge system 1 upon successful completion may be a fixed multiple of the entry fee. In one embodiment, the entry fee with respect to a sport challenge may be fixed. In a further embodiment, the fixed entry fee may be selected by a participant from fees within a fixed range specified by the multi-sport challenge system 1, e.g., by operators of the sport challenge facility. The financial prize for successful completion of the sport challenge may be variable based on the entry fee amount. Additionally or alternatively, the financial prize payout may be variable based on a characteristic classification, individual details, or combination thereof of the participant, which in some instances may be associated with variable odds. For example, entry fee and/or financial prize amounts for particular sport challenges may be variable based on classification designations of participant characteristics, such as age, sex, handedness, weight, height, or another characteristic of the participant. For example, variable financial prize payout amounts may be higher or lower for participants in characteristic classifications older than 30, 40, 50, 60, or 70 or within age group classifications of 18-29, 30-45, 46-55, 56-65, 67-80, and 81+. In some configurations, characteristic classifications may be associated with variable fixed entry fee amounts such that available entry fees may be different for participants in different characteristic classifications. Similarly, objectives of particular sport challenges may be varied based on one or more characteristics of the participant. In some embodiments, the financial prize may also be variable based on certain classifications corresponding to characteristics of the participant. For example, a participant under five feet tall or 50 years old may receive a $1000 prize for throwing to home plate from centerfield and hitting a target while those younger than 50 years old and five feet tall or more may have the opportunity to receive $500 for the same sport challenge.

In one embodiment, financial prize payouts may be variable based on entry fee amount and one or both of a characteristic classification or individual details. The variable payout may be represented in multiples, odds, or set payout values, for example. Individual details may be personalized to the individual rather than a more general characteristic associated with a designated classification. Individual details may include individualized information or skills such as prior experience relevant to the sport challenge. For example, a variable financial prize payout for a participant that has played organized baseball may receive a smaller payout upon successful completion of a baseball related sport challenge when compared with a variable financial prize payout for a participant that has not played organized baseball. Similarly, the variable payout for a participant that has played high school basketball may receive a smaller payout upon successful completion of a basketball related sport challenge when compared to a participant the played organized basketball only in elementary school. In some embodiments, individual details may include the participant's prior performance in the same, replated, or other sport challenges. In some embodiments, individual details may include the particular age of the participant rather than an age classification, e.g., age grouping. As described in more detail elsewhere herein, in some embodiments, enhancers may also be included, such as attempting the sport challenge with a non-dominant hand or leg, e.g., increasing available payout upon successful completion of the sport challenge.

As introduced above, sport challenges may be associated with a fixed entry fee and variable financial payouts that are based on certain criteria such as the entry fee amount and certain individual details (e.g., personalized) or characteristic classifications of the participant. In one instance, the sport challenge menu 130 presents the participant with a fixed entry fee or fixed entry fee range from which the participant may select a fixed entry fee. That is, participants may be provided the opportunity to choose the entry fee amount within an allowable range. The range may be set by the fee/prize subsystem 26, e.g., based on criteria defined therein. The entry may be a fixed dollar amount or may be a fixed range of permissible entry fee amounts set forth by the facility. The payout to a participant if the attempt is successful may be a fixed multiple of the entry fee.

In one embodiment, the multi-sport challenge system 1 includes a multi-sport facility 10 whereby participants pay an entry fee to win a prize. The entry fee may be fixed to a single entry fee applicable to all participants. The entry fee may be fixed to be within a predetermined range such that the participant may select a fixed fee within the available range. The variable for a prize payout to a successful participant may be a multiple of the entry fee. For example, the payout to a participant upon successful completion of a sport challenge may be fixed to a multiple of the entry fee. The financial prize payout may be variable based on participant characteristics such as the participant belonging to a specific, predetermined designated classification or possessing specific individualized details. Thus, the entry fee may be fixed at the time of or prior to participation so as to not change. The financial prize may be a fixed multiple of the entry such that it is fixed at the time of or prior to participation and does not change. As indicated above, the fixed multiple may be variable to the participant and the financial prize payout may also be, as to potential participants, variable as a multiple of the entry fee and based on characteristics of the participant selected from one or more designated classification (e.g., age group, sex, gender, height class, weight class), individual details (e.g., experience, past performance in the same or other sport challenges), or combination thereof.

In one example, a sport challenge of kicking a football through uprights may be associated with age brackets such as 18-30, 31-40, 41-50, 51-60, and 61+ wherein the odds of a successful kick decrease over the age bracket ranges such that the payouts for a successful kick increase for older participants. Other participant classifications may additionally or alternatively be associated with variable odds such as gender, whether the participant is right or left-handed, or other classification characteristic of the participant. The participant may submit the entry fee via the fee/price subsystem 26. The participant may select the sport challenge, which may include multiple sport challenges, from the sport challenge menu 130. Payouts upon successful completion of the sport challenge may be issued, e.g., paid or credited, to participants via the fee/price subsystem 26.

In one embodiment, designations for participant classifications may be displayed on the sport challenge menu 130. The designations may be displayed with associated variable payout odds or associated payout multiples. In one embodiment, individualized participant details may be selected by a participant via interaction with the fee/prize subsystem 26. For example, participants may complete a questionnaire regarding the participant's details. The questionnaire may be specific to a particular sport challenge or to multiple sport challenges. The fee/prize subsystem 26 may calculate and present variable odds specific to the participant, such as on the sport challenge menu 130, which may be available on a kiosk, dedicated device, smartphone app, or otherwise. The fee/prize subsystem 26 may execute an algorithm based on the provided details to calculate the variable odds. In one embodiment, the participant provides their details to a facility representative, and the representative determines variable odds, if applicable.

In some embodiments, an entry fee may give a participant more than one attempt to successfully complete the sport challenge. In one configuration, multiple attempts may be available for an increased entry fee or may reduce the financial prize available after each failed attempt.

In some embodiments, sport challenges are provided with a fixed entry fee and variable financial prize payouts based on a number of attempts a participant takes to successfully perform the sport challenge. The number of allowed attempts may be fixed prior to attempting the sport challenge. The number of attempts may be limited to a time period, such as a given day. The variable financial prize may cascade such that the value of successfully performing the sport challenge decreases based on a number of attempts the participant takes. In one example, attempts are limited to a calendar day and the financial prize or multiple for calculating the financial prize reaches zero after a predetermined number of failed attempts. In a further example, the participant is provided an opportunity to select the amount of the entry fee. The entry may be a fixed dollar amount, or a fixed range of permissible entry fee amounts may be set forth by the facility in the sport challenge menu 130 or otherwise. In one instance, the sport challenge menu 130 presents participants with an allowable entry fee range from which participants may select a desired entry fee. In this or another instance, the sport challenge menu 130 may present participants with multiple entry fee amounts from which to select a desired entry fee. The payout to participants upon successful completion of the sport challenge may be a multiple of the entry fee. Multiples may include multipliers, such as whole or partial multipliers, e.g., 0.5, 1, 1.9, 2, 2.5, etc. In one embodiment, participants pay an entry fee to win a financial prize wherein the payout is a predetermined fixed value that varies based on the number of attempts made by the individual participant at achieving the challenge in a given period of time. In a further example, participants may choose how much to pay as an entry fee, such that the financial prize payout also becomes a multiple of the entry fee. In one example, a participant may select the period of time wherein the variable applicable to the financial prize decreases with increasing time.

In one embodiment, a participant may pay an entry fee for an attempt at a same or multi-sport parlay. In one example, the participant may select the sport challenges included in the parlay. In another example, the participant may select a portion or none of the sport challenges included in the parlay. For instance, the participant may select one or more sports associated with available sport challenges from which the challenges will be assigned, e.g., randomly or according to a predetermined schedule. The predetermined schedule may be based on a difficulty rating, for example. In another example, the participant is assigned one or more sport challenges without the opportunity to select the particular challenge. Such assigned sport challenges may award larger financial prizes than those that the participant is able to select.

As introduced above, a sport challenge may include successfully performing multiple sport challenges, such as within a predetermined period of time (e.g., a day), within a predetermined number of attempts, or both. In one example, the number of sport challenges are set by the multi-sport challenge system 1. In one example, the identification and number of sport challenges included in the sport challenge is predetermined. In a further example, the multi-sport challenge system 1 predefines the sport challenges included based on criteria of the participant, which may include characteristics, individual details, or combination thereof. In one example, the participant selects the number of sport challenges from an available list provided by the multi-sport challenge system 1 and the multi-sport challenge system 1 selects the sport challenges. In a further example, the participant selects the sports or sports grounds corresponding to sport challenges available for the same and the multi-sport challenge system 1 selects the particular sport challenges in which the participant is to successfully complete to win the financial prize. In an example, the number of the sport challenges are determined by the multi-sport challenge system 1, such as two, three, four, etc., and the participant must perform all of the challenges to win the financial prize. The financial prize may be variable based on the difficulty of the challenges. In one example, the financial prize payout may be variable based on characteristics of the participant, individual details of the participant, entry fee amount, number of attempts, time period for successful completion, or any combination thereof. Any combination of these variables may be applied to all or a portion of the multiple sport challenges included in the sport challenge.

In one configuration, the multi-sport challenge system 1 includes a multi-sport facility 10 wherein participants pay an entry fee to win a prize. The financial prize value may be a multiple based on a participant's success in achieving multiple of certain predetermined challenges. In a further configuration, the participants pay an entry fee to win a prize wherein the entry fee is predetermined or may be selected by the participant within an allowable range as specified by the multi-sport challenge system 1, which may be presented by the sports challenge menu 130 and selected, paid, or both via interaction with the fee/prize subsystem 26. The financial prize value may be is a multiple based on a participant's success in achieving multiple of certain predetermined challenges and may also be a multiple based on one or more of the entry fee, a classification of a characteristic of the participant, individual details of the participant, or combination thereof. In one configuration, participants may compete with the multi-sport challenge system 1 such that successful completion of the challenge requires all participants to successfully complete the challenge.

With reference again to FIG. 1 together with FIGS. 3A-3F, the fee/prize subsystem 26 may generate, output, or otherwise provide a sport challenge menu 130 listing sport challenges and associated entry fees and financial prizes that participants may select. FIG. 3A illustrates an example soccer sport challenge menu 130*a* including plurality of soccer related sport challenges including associated entry fees and financial prizes. FIG. 3B illustrates an example football sport challenge menu 130*b* including plurality of football related sport challenges including associated entry fees and financial prizes. FIG. 3C illustrates an example basketball sport challenge menu 130*c* including plurality of basketball related sport challenges including associated entry fees and financial prizes. FIG. 3D illustrates an example baseball sport challenge menu 130*d* including plurality of baseball related sport challenges including associated entry fees and financial prizes. FIG. 3E illustrates an example bowling sport challenge menu 130*e* including plurality of bowling related sport challenges including associated entry fees and financial prizes. FIG. 3E illustrates an example shooting sport challenge menu 130*f* including plurality of shooting related sport challenges including associated entry fees and financial prizes. The sport challenge menus 130*a*, 130*b*, 130*c*, 130*d*, 130*e*, 130*f* are provided for illustration purposes with respect to sports, associated sport challenges, entry fees, and financial prizes. It is to be appreciated that embodiments may include additional, fewer, as well as different sports, associated sport challenges, entry fees, and financial prizes.

Sport challenge menus 130*a*, 130*b*, 130*c*, 130*d*, 130*e*, 130*f* may be displayed as signage with respect to a fee/subsystem building or structure, provided as handout documents to participants, displayed as signage or posted at one or more kiosk stations around the multi-sport facility, displayed as signage or posted at various sport grounds or surrounding portions thereof, e.g., available sport challenges associated with a particular sport grounds may be displayed at or near the associated sport grounds, or may be accessible for display on user electronic devices, e.g., handheld device, tablet, smart phone, or the like.

In one example, the fee/prize subsystem may provide one or more sport challenge menus 130*a*, 130*b*, 130*c*, 130*d*, 130*e*, 130*f* in an interactive environment wherein prospective participants may interact with the sport challenge menus 130*a*, 130*b*, 130*c*, 130*d*, 130*e*, 130*f* to obtain more information regarding the listed sport challenges. For instance, sport challenge menus 130*a*, 130*b*, 130*c*, 130*d*, 130*e*, 130*f* may be displayed on an interactive screen, e.g., kiosk touch screen, or be displayed on a user device, e.g., a smart phone, via a website or app executed or accessed on the user device. If enhancers are available, the sport challenge menus 130*a*, 130*b*, 130*c*, 130*d*, 130*e*, 130*f* may similarly include a list of associated enhancers. In one example, a user may select a desired sport challenge from a sport challenge menu 130*a*, 130*b*, 130*c*, 130*d*, 130*e*, 130*f* via the fee/prize submodule, e.g., interacting with an interactive screen, application, website, or through verbal communication with on-site staff of the fee/prize subsystem.

The fee/prize subsystem may be configured to accept digital fund transfers and/or send digital fund transfers with respect to entry fees and/or financial prizes. The fee/prize subsystem may address or be addressed by user devices via near field, wired, and/or wireless communication networks. Funds may be digitally transferred between a sport challenge account and/or a third-party account, such as a digital wallet, e.g., banking app account, GOOGLE WALLET™, GOOGLE PAY®, APPLE PAY®, ALIPAY®, VENMO®, ZELLE®, DWOLLA®, or PAYPAL®.

Further to the above, the fee/prize subsystem may directly or indirectly execute fund transfers with respect to entry fee and financial prize payments. Fund transfers may also be mediated by a third-party fund transfer service. The fee/prize subsystem may be configured to interact with user devices of participants to set up accounts, such as digital wallet accounts, receive payments, make payments, and/or select sport challenges. In one embodiment, participants may set up and fund accounts with the fee/prize subsystem to be used for entry fee payments and/or receiving financial prize fund transfers.

The multi-sport challenge system may include a sport challenge link configured to assist in operation of the multi-sport challenge system. The sport challenge link may include a sport challenge app and/or sport challenge website. The sport challenge link may be utilized to link participants, via user devices, with the fee/prize subsystem. For example, the sport challenge link may be used to link digital, e.g., mobile, payment methods or accounts from which fund transfers may be executed between participants and the fee/prize subsystem. Payment methods and/or accounts may include accounts specific to the fee/prize subsystem, such as a sport challenge account, and/or accounts associated with third-party providers, any of which may include digital wallets. Payment methods may include a digital wallet setup and handled directly with the fee/prize subsystem or a third-party digital wallet such as GOOGLE WALLET™, GOOGLE PAY®, APPLE PAY®, ALIPAY®, VENMO®, ZELLE®, DWOLLA®, or PAYPAL®. to which fund transfers to and/or from participants and the fee/prize subsystem may be mediated.

As introduced above, in some embodiments, participants may establish a sport challenge account with the fee/prize subsystem. Sport challenge accounts may be established, for example, using the sport challenge link, which may include a sport challenge app executed on a user device or via a sport challenge website configured to provide user devices a secure link to the sport challenge account. In one embodiment, a sport challenge account comprises a digital wallet configured for executing fund transfers between the fee/prize subsystem and one or more participant accounts. In some configurations, participants may link their sport challenge accounts to third party fund transfer services and/or digital wallet to transfer funds into and out of their sport challenge accounts. The fee/prize subsystem may address or be addressed by user devices via near field, wired, and/or wireless communication networks to initiate and/or complete fund transfers with sport challenge accounts.

In one embodiment of an operation of the multi-sport challenge system, a participant, using a user device such as a smart phone, smart watch, tablet, or computer, or an on-site user interface such as a kiosk, may view and select one or more sport challenges. If the participant has a sport challenge account linked to the user device or has identified a sport challenge account to the user interface, an entry fee may be withdrawn if indicated by the participant or setup for such autopayment in the user account. In one example, a user may pay cash or credit rather than withdraw the entry fee from their sport challenge account. In a further example, participants may freely choose to pay entry fees with cash or credit and receive financial prizes in cash, credit, or deposit into their sport challenge account. In another example, participants are provided a card or other digital identification technology, e.g., active or passive RFID, BLUETOOTH® low energy technology, IBEACON®, near field, etc., which may also be associated with a user device, that may be detected by a reader or scanner of the fee/prize subsystem to identify the participant. The participant may swipe or merely position their digital identification for proximity reading or scanning for identification to initiate entry fee payment from their sport challenge account. The sport challenge selection and entry fee payment may also link the participant and the sport challenge account for transfer of financial prize funds if the participant successfully completes the selected sport challenge.

In various embodiments, the fee/prize subsystem may also include a participant monitoring unit. The monitoring unit may be configured to monitor participants with respect to adherence to rules applicable to attempts for selected sport challenges. Additionally or alternatively, the monitoring unit may be configured to verify successful completion of attempted sport challenges and/or associate the successful completion of sport challenges to a participant. The monitoring unit may include detection devices such as readers, scanners, or cameras to track and/or identify participants. The detection devices may utilize any suitable identification technology such as digital identification technology, e.g., active or passive RFID, BLUETOOTH® low energy technology, IBEACON®, near field, or recognition technology, e.g., facial, IR, or other biological or physiological recognition technology. Upon verification of successful completion of the sport challenge and identification of the participant by the monitoring unit, the fee/prize subsystem may initiate a fund transfer to an account, e.g., sport challenge account, linked to the participant.

In some embodiments, multi-sport challenge facility staff may one or more of receive sport challenge selections, collect entry fee payments, assist in organizing and/or conducting sport challenge attempts, monitoring participant adherence to rules applicable to attempts for selected sport challenges, verifying successful completion of attempted sport challenges, identification of participants successfully completing attempted sport challenges, or payment of financial prizes.

Additionally or alternatively to providing individual sport challenges in a wagering application, in some embodiments the multi-sport facility may be configured for competing in recreational sport play, rental for group outings, and/or athletic training in specific or multiple disciplines, with or without wagering. For example, the multi-sport challenge system 1 has been described above such that entry fees are placed with the fee/prize subsystem, whereby the multi-sport challenge facility 10 or fee/prize subsystem 26 operates as the house and financial prizes are paid out by the fee/prize subsystem 26 upon successful completion of the sport challenge. However, in some embodiments, the multi-sport challenge system 1 may include sport challenge competition wagering.

Competition wagering may include peer-to-peer wagering wherein the multi-sport challenge system 1 operates as the marketplace and facilitates sport challenge wagering agreements between parties, which may include participants and non-participants. For example, multi-sport competition wagers may be made between and among two participants in the same challenge. In one configuration, multi-sport competition wagers may be based on individual challenge activity. Multi-sport competition wagers may be based on one or more characteristic classifications of each individual participant. Multi-sport competition wagers may be made between and among two participants in the different challenges. In one configuration, multi-sport competition wagers may be made between and among more than two challenge participants. In some implementations, odds may be provided irrespective of the participants, e.g., classifications, individual details, or both. In this or another implementation, the system may additionally or alternatively generate odds as described herein based on participant characteristics and/or relative characteristics, e.g., classifications, details, or both.

In some implementations, e.g., in a peer-to-peer setting, the participants may set their own odds. In a further implementation, instead of setting the odds, the system may be configured to suggest odds based on participant characteristics and/or relative characteristics, e.g., classifications, details, or both. It will be appreciated that, as to the various embodiments described herein, the odds, including entry fee and/or payout multiples, may be include consideration of the particular sport challenge, relative difficulty of the sport challenge to participants or participants having the characteristics of the participant, or to the participant, or combination thereof, which may also include relative difficulty between participants performing the same or different sport challenges in competitive sport challenges.

In one example, two or more participants, which may include two or more participants or groups of participants, may pay an entry fee to compete in one or more sport challenges where the participant or participant group having the superior performance is awarded a financial prize comprising a portion of the combined entry fee. The entry fee will typically be higher than it would be where the fee/prize subsystem operates as the house to payout financial prizes.

In one embodiment of a sport challenge competition, the participant parties identify a sport challenge having a stated goal in which both participant parties will attempt to perform. In one example, the fee/prize subsystem 26 selects the sport challenge or sport challenges or presents a list of available sport challenges for selection. Parameters of the sport challenges may be presented to the participants for selection and, in one configuration, user specification or modification. The participant parties may perform the same or different challenges. The participant parties may compete directly against each other, e.g., paintball, tennis, volleyball, pickleball, paddleball, half-court basketball, or as otherwise specified. In any of the above, the sport challenge may be handicapped to allow a less that evenly matched set of participants to compete on a level playing field in a same sport challenge. For instance, a first participant in a tennis serving challenge must perform a proper serve at over 40 mph and a second participant must perform a proper serve at over 70 mph. Thus, the stated goal for the sport challenge may be different for the various competing participating parties. In a darts sport challenge competition, a first party may be required to hit all numbered fields for a cricket match three times or equivalent before a second party hits all numbered fields for a cricket match at least one time. In one example, participants may compete in different sport challenges. For example, a first participant may compete in a bowling related sport challenge requiring the participant to successfully bowl a strike or other bowling related challenge using a full, partial, or simulated bowling lane and a second participant may compete in a volleyball related sport challenge requiring the participant to successfully complete a serve at a particular speed, to a particular location, or both or other volleyball related sport challenge using a full, partial, or simulated volleyball court. As noted above, a participant may participate in a multi-challenge sport challenge while competing against another participant in a single or multi-challenge, which may be the same or different than the other participant. In some instances, differential sport challenges in type, goal, sport, number, or combination thereof may be used as a handicapping device to better achieve desired odds. In some embodiments, the participants or the multi-sport challenge system 1 may handicap the sport challenge by setting odds. The entry fee paid by the participant parties may be different such that the amount risked via the entry fee and paid out to the successful party is different.

As consideration for creating the marketplace, hosting the underlying sporting activity, and in certain instances also determining/setting the odds for the peer wagers, a portion of the entry fee may be retained and paid to the multi-sport challenge system 1 as a host fee. Host fees may be a percentage of each wager entry fee made amongst the participants, a flat fee off each entry fee wager, or a flat usage fee or a timed usage fee for the amount of time the participants use the specific sports grounds to conduct the sport challenge. Thus, participants in a sport challenge may compete with or against one another, and the multi-sport challenge system 1 is provided a fee.

In one configuration, if none of the participants achieves the stated goal, then no financial prize exchanges hands between the participants, and the entry fee is returned or credited while the host fee, whether separate or a portion of the entry fee, is retained. In this or another configuration, if one of the participant parties achieves the stated goal, the financial prize is paid to the winner in accordance with the odds set. Such odds may be set by the participants or multi-sport challenge system. For example, if the assigned odds are 3 to 1 for hitting two three-point shots in a row, and one participant achieves this stated goal, the entry fee of the other participants is used to payout the financial prize according to the odds. In one embodiment, if both or multiple participant parties achieve the stated goal, then the financial prize is paid out based on the odds set, which may be set by the participants or multi-sport challenge system. The entry fee of each participant may represent the payout to the other participants if those participants win the wager. The host fee may be a component of the entry fee or collected from the payout. The fee/prize subsystem may hold the wagered amounts from the parties and credit any unearned funds at the completion of the competition. In one embodiment, competitive sport challenge may require a host fee wherein the fee/prize subsystem 26 does not participate in making payouts and the competitive sport challenge is provided as a peer-to-peer experience.

In one embodiment of a peer-to-peer configuration, a party may wager whether another can successfully achieve a specific sport challenge. For example, a first party may be a participant that participates in the challenge, and the wager is with a second party that is a non-participant peer as to whether that the first party can achieve the specific challenge. The non-participant may take the bet that the participant will not achieve the challenge. If the participant does not achieve the challenge, the non-participant is not awarded the financial prize. In one configuration, the participant may instead be awarded the financial prize, which may be a portion of the entry fee less a flat fee or percentage representing a rake or hosting fee. In one configuration, the multi-sport challenge system retains the entry fee as a hosting fee and the parties are responsible for the payout of the financial prize to the party that wins the challenge according to the terms of the agreement. In another configuration, a portion of the entry fee is paid or credited back to the non-participant, less a flat fee or percentage representing a rake or hosting fee. As previously noted, in some embodiments, the financial prize may be taken from the entry fee, which may represent a hosting fee, amount risked, or both. A portion of the entry fee may be collected as a hosting fee as described herein. In some embodiments, the amount of the entry fee may be specified by the sports challenge menu 130, fee/prize subsystem 26, or may be specified or selected by one or both parties, which may include selection from a predefined list of range of entry fees as described herein via interaction with the sports challenge menu 130 or fee/prize subsystem 26.

In various embodiments of a peer-to-peer involved sport challenge, a non-participant may wager with respect to the participant successfully performing the sport challenge. Odds may be set by the multi-sport challenge system 1, participant, or non-participant as made available by the system. The non-participant may agree to or pay a fee, which may be analogous to an entry fee described herein wherein the non-participant receives a financial prize if the participant successfully performs the sport challenge. Odds may or may not be applied depending on the agreement. A portion of the fee or a percentage of the financial prize may be paid to or retained by the multi-sport facility. In another scenario, the non-participant may agree to or pay an entry fee whereby the entry fee or portion thereof represents the financial prize awarded to the participant, which may be reduced by a flat fee or percentage to the multi-sport facility 10, if the participant successfully performs the sport challenge. In another scenario, both the participant and the non-participant pay an entry fee wherein if the participant successfully performs the sport challenge the participant receives a financial prize having a value of the entry fees, which may be reduced by a flat fee or percentage to the multi-sport facility. If instead the participant fails to successfully perform the sport challenge, the non-participant is awarded the financial prize. In one example, the participant, non-participant, or both pay an entry fee comprising a flat fee or percentage of a wagered amount. The flat fee may be a hosting fee based on the sport grounds used for the challenge, the sport challenge, an amount wagered, or projected time to complete the sports challenge. The parties may agree to pay the applicable financial prize to be awarded to the winning party as described herein. For example, the non-participant may payout the financial prize to the participant if the participant successfully performs the sport challenge. If the agreement includes the participant paying a financial prize to the non-participant if the participant is unable to successfully perform the sport challenge, the participant may payout the financial prize to the non-participant, which may be a same or different financial prize that the non-participant would be required to award the participant if the participant successfully performed the sport challenge, e.g., based on odds. Thus, in various embodiments, the participant and non-participant may agree to directly or indirectly payout the financial prize to the winner. This result may similarly be applied to other competitive sport challenges described herein.

In one configuration of a competitive sport challenge, the sport challenge may include any sport challenge, such as those described herein, and the participant successfully completing the sport challenge where the other has failed is declared the winner and is awarded the financial prize. In one example, if no participant or participant group successfully completes the sport challenge within the allotted number of attempts or time, the sport challenge is over, and no participant receives a financial prize. In another embodiment, if no participant or participant group successfully completes the sport challenge within the allotted number of attempts or time, the participants may repeat the same or a different sport challenge until one participant or participant group has successfully completed the repeated sport challenge were the other participants or participant groups have failed. In an above or another example, if multiple competing participants or participant groups successfully completes the sport challenge, those participants or participant groups may repeat the same or a different sport challenge until only one competing participant or participant group has continued to successfully complete the sport challenge to the failure of the remaining participants or participant groups. In a further example, repeated sport challenges increase the difficulty of the sport challenge, e.g., throwing, shooting, or kicking distances to successfully complete the sport challenge may be increased or target may be put in motion or target sizes may be decreased.

In an above or another configuration, sport challenges may be modified to competitive sport challenges such that a participant or participant group is awarded the financial prize for performing the sport challenge to a better degree than the other participants or participant groups, such as proximity to a target or distance may be used. For example, participants may compete in a golf related competitive sport challenge wherein the winner is determined as the closest to the hole or the longest drive. Still another competitive sport challenge may actively pit participants or participant groups against each other. For example, soccer penalty shots may be exchanged wherein the winner is the participant or participant group that scores more penalty goals on the other.

Upon reading the present disclosure, those having skill in the art will appreciate that the embodiments described herein with respect to fixed entry fees and payouts may alternatively be executed using various wagering systems such as parimutuel, spread betting, or the like. Such embodiments are contemplated herein and are included in the present disclosure with respect to all embodiments described otherwise. Additionally, while financial prizes are generally described herein as be calculated from multiples, those having skill in the art upon reading the present disclosure will appreciate that other payout schemes may similarly be applied, such as set payout values that are not multiples. Such embodiments are contemplated herein and are included in the present disclosure with respect to all embodiments described otherwise.

The present disclosure may include dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example network or system is applicable to software, firmware, and hardware implementations.

In accordance with various embodiments of the present disclosure, the processes described herein may be intended for operation as software programs running on a computer processor. Furthermore, software implementations can include, but are not limited to, distributed processing or component/object distributed processing, parallel processing, or virtual machine processing that may be constructed to implement the methods described herein.

The present disclosure describes various systems, modules, units, devices, components, and the like. Such systems, modules, units, devices, components, and/or functionalities thereof may include one or more electronic processers, e.g., microprocessors, operable to execute instructions corresponding to the functionalities described herein. Such instructions may be stored on a computer readable medium. Such systems, modules, units, devices, components, and the like may include functionally related hardware, instructions, firmware, or software. For example, modules or units thereof, which may include generators or engines, may include physical or logical grouping of functionally related applications, services, resources, assets, systems, programs, databases, or the like. The systems, modules, units, which may include data storage devices such as databases and/or pattern library may include hardware storing instructions configured to execute disclosed functionalities, which may be physically located in one or more physical locations. For example, systems, modules, units, components or functionalities thereof may be distributed across one or more networks, systems, devices, or combination thereof. It will be appreciated that the various functionalities of these features may be modular, distributed, and/or integrated over one or more physical devices. It will be appreciated that such logical partitions may not correspond to physical partitions of the data. For example, all or portions of various systems, modules, units, or devices may reside or be distributed among one or more hardware locations.

The present disclosure contemplates a machine-readable medium containing instructions so that a device connected to the communications network, another network, or a combination thereof, can send or receive voice, video or data, and to communicate over the communications network, another network, or a combination thereof, using the instructions. The instructions may further be transmitted or received over the communications network, another network, or a combination thereof, via the network interface device. The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure. The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth in this specification. Such embodiments may be obtained, for example, by combining, modifying, or re-organizing any of the disclosed steps, components, elements, features, aspects, characteristics, limitations, and the like, of the various non-limiting and non-exhaustive embodiments described in this specification.

Various elements described herein have been described as alternatives or alternative combinations, e.g., in a lists of selectable sport challenges, entry fees, financial prizes, sport grounds, etc. It is to be appreciated that embodiments may include one, more, or all of any such elements. Thus, this description includes embodiments of all such elements independently and embodiments including such elements in all combinations.

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an application of the described embodiments. Further, the use of a singular noun includes the plural, and the use of a plural noun includes the singular, unless the context of the usage requires otherwise. Additionally, the grammatical conjunctions "and" and "or" are used herein according to accepted usage. By way of example, "x and y" refers to "x" and "y". On the other hand, "x or y" corresponds to "x and/or y" and refers to "x", "y", or both "x" and "y", whereas "either x or y" refers to exclusivity.

What is claimed is:

1. A method of operating a multi-sport challenge system, the method comprising:

providing a multi-sport facility including a plurality of sport grounds, wherein each of the sport grounds includes a full sport grounds, partial sport grounds, sport simulator grounds, or combination thereof;

providing a plurality of different selectable sport challenges to attempt through interaction with the sport grounds corresponding to the selected sport challenge sport, each sport challenge having an associated entry fee for an opportunity to attempt the sport challenge and an associated financial prize to be awarded if the attempt successfully performs the sport challenge, wherein the plurality of sport grounds comprise at least three different types of sport grounds, each hosting at least one of the sport challenges, and wherein the at least three different types of sport grounds and the at least one corresponding at least one sport challenge hosted by the sport grounds are selected from the group consisting of:

at least a partial baseball field that hosts one or more sport challenges comprising successfully throwing a ball from a specified area of the baseball field and hitting a target, obtaining a ball speed at or above a specified speed, or hitting a target at a ball speed at or above a specified speed, a bowling lane that hosts a sport challenge comprising successfully bowling a ball down the bowling lane to score a strike, at least a partial basketball court including a basketball goal that hosts a sport challenge comprising successfully shooting a basketball through the basketball goal from one or more specified locations of the at least partial basketball court, at least a partial baseball field or baseball simulator that hosts a sport challenge comprising successfully hitting an actual or simulated baseball with a baseball bat, a par 3 golf hole that hosts one or more sport challenges comprising successfully hitting a golf ball from a tee box of the par 3 golf hole and scoring a hole-in-one or positioning the golf ball within a specified distance from a golf hole, a golf simulator that hosts one or more sport challenges comprising successfully hitting a golf ball a specified distance or greater or positioning the golf ball onto a simulated green or within a specified distance from a simulated golf hole of the simulated green, at least a partial American football field including uprights that hosts a sport challenge comprising successfully kicking a football through the uprights, at least a partial soccer field including a soccer goal or target that hosts one or more sport challenges comprising successfully kicking a soccer ball into the soccer goal, hitting the target, or hitting the target in the soccer goal, a full or partial tennis court or tennis simulator that hosts a sport challenge comprising successfully serving a tennis ball to a target location, and a cornhole board that hosts a sport challenge comprising successfully tossing a cornhole bag through a hole in the cornhole board;

receiving sport challenge selections made by participants;

collecting the associated entry fees for the selected sport challenges; and distributing the associated financial prizes to participants upon their successful performance of the selected sport challenges.

2. The method of claim 1, wherein the entry fee is a fixed fee.

3. The method of claim 1, wherein the entry fee is a fixed fee selected by the participant from a predetermined range of entry fees prior to attempting the sport challenge.

4. The method of claim 1, wherein the financial prize is variable based on a characteristic classification of the participant, one or more individual details of the participant, or both.

5. The method of claim 4, wherein the financial prize is further variable based on a number of attempts the participant takes to successfully perform the sport challenge.

6. The method of claim 4, wherein the sport challenge comprises multiple sport challenges that the participant must successfully perform, and where the multiple sport challenges are performed on a same or different sports grounds.

7. The method of claim 4, wherein the financial prize is a multiple of at least a portion of the entry fee and is fixed prior to the participant attempting the sport challenge.

8. The method of claim 4, wherein the financial prize is variable based on the characteristic classification of the participant.

9. The method of claim 8, wherein the characteristic classification is selected from one or more of sex, age group, height, weight, or handedness.

10. The method of claim 1, wherein the financial prize is a variable based on a number of attempts the participant takes to successfully perform the sport challenge.

11. The method of claim 10, wherein the attempts must be performed within a predefined period of time.

12. The method of claim 11, wherein the period of time is one calendar day.

13. The method of claim 10, wherein the financial prize is a multiple of the entry fee and is reduced upon each failed attempt.

14. The method of claim 13, wherein the multiple applicable to each attempt is fixed prior to attempting the sport challenge.

15. The method of claim 1, further comprising facilitating an agreement between or among two or more participants to compete in the sport challenge, the sport challenge being the same or different for the respective participants.

16. The method of claim 15, further comprising utilizing odds associated with the agreement to determine the financial prize for successful performance of the sport challenge.

17. The method of claim 16, further comprising generating the odds on a per participant basis.

18. The method of claim 17, wherein the odds are based on a characteristic classification of the participants, individual details of the participants, or both.

19. The method of claim 16, wherein the participants determine the odds associated with the agreement.

20. The method of claim 19, wherein the entry fee is a flat fee or a percentage of the financial prize.

21. The method of claim 16, further comprising awarding the financial prize to the participant that performs the sport challenge to a greater degree.

22. The method of claim 1, further comprising facilitating an agreement between a participant and non-participant, wherein the non-participant agrees to directly or indirectly pay the financial prize to the participant if the participant successfully performs the sport challenge.

23. The method of claim 22, wherein the entry fee is a flat fee or a percentage of the financial prize.

24. The method of claim 1, wherein the corresponding sport challenge with respect to the bowling lane further comprises scoring a predetermined number of strikes in a row.

25. The method of claim 1, wherein the corresponding sport challenge with respect to the cornhole board further comprises successfully tossing a predetermined number of bags through the hole in the cornhole board in a row or within a predetermined number of tosses.

26. A method of operating a multi-sport challenge system, the method comprising:

providing a multi-sport facility including a plurality of sport grounds, wherein each of the sport grounds includes a full sport grounds, partial sport grounds, sport simulator grounds, or combination thereof;

providing a plurality of different selectable sport challenges to attempt through interaction with the sport grounds corresponding to the selected sport challenge sport, each sport challenge having an associated entry fee;

facilitating an agreement between a participant and non-participant, wherein the non-participant agrees to pay a financial prize to the participant if the participant successfully performs the sport challenge;

receiving sport challenge selections made by participants; and collecting the associated entry fees for the selected sport challenges, wherein the plurality of sport grounds comprise at least three different types of sport grounds, each hosting at least one of the sport challenges, and wherein the at least three different types of sport grounds and the at least one corresponding at least one sport challenge hosted by the sport grounds are selected from the group consisting of:

at least a partial baseball field that hosts one or more sport challenges comprising successfully throwing a ball from a specified area of the baseball field and hitting a target, obtaining a ball speed at or above a specified speed, or hitting a target at a ball speed at or above a specified speed, a bowling lane that hosts a sport challenge comprising successfully bowling a ball down the bowling lane to score a strike, at least a partial basketball court including a basketball goal that hosts a sport challenge comprising successfully shooting a basketball through the basketball goal from one or more specified locations of the at least partial basketball court, at least a partial baseball field or baseball simulator that hosts a sport challenge comprising successfully hitting an actual or simulated baseball with a baseball bat, a par 3 golf hole that hosts one or more sport challenges comprising successfully hitting a golf ball from a tee box of the par 3 golf hole and scoring a hole-in-one or positioning the golf ball within a specified distance from a golf hole, a golf simulator that hosts one or more sport challenges comprising successfully hitting a golf ball a specified distance or greater or positioning the golf ball onto a simulated green or within a specified distance from a simulated golf hole of the simulated green, at least a partial American football field including uprights that hosts a sport challenge comprising successfully kicking a football through the uprights, at least a partial soccer field including a soccer goal or target that hosts one or more sport challenges comprising successfully kicking a soccer ball into the soccer goal, hitting the target, or hitting the target in the soccer goal, a full or partial tennis court or tennis simulator that hosts a sport challenge comprising successfully serving a tennis ball to a target location, and a cornhole board that hosts a sport challenge comprising successfully tossing a cornhole bag through a hole in the cornhole board.

27. The method of claim 25, wherein the entry fee is a flat fee or a percentage of the financial prize.

* * * * *